(12) United States Patent
Finn

(10) Patent No.: US 11,315,003 B2
(45) Date of Patent: Apr. 26, 2022

(54) RFID ENABLED METAL TRANSACTION CARDS

(71) Applicant: Federal Card Services, LLC, Cincinnati, OH (US)

(72) Inventor: David Finn, Füssen Weissensee (DE)

(73) Assignee: Federal Card Services, LLC, Cincinnati, OH (US)

( * ) Notice: Subject to any disclaimer, the term of this patent is extended or adjusted under 35 U.S.C. 154(b) by 0 days.

(21) Appl. No.: 17/219,916

(22) Filed: Apr. 1, 2021

(65) Prior Publication Data

US 2021/0350198 A1    Nov. 11, 2021

Related U.S. Application Data

(63) Continuation-in-part of application No. 17/092,332, filed on Nov. 9, 2020, now abandoned, and a continuation-in-part of application No. 17/019,378, filed on Sep. 14, 2020, which is a continuation-in-part of application No. 16/994,558, filed on Aug. 15, 2020, now Pat. No. 11,113,593, and a continuation-in-part of application No. 16/993,295, filed on Aug. 14, 2020, which is a continuation-in-part of application No. 16/991,136, filed on Aug. 12, 2020.

(60) Provisional application No. 63/160,974, filed on Mar. 15, 2021, provisional application No. 63/053,559, filed on Jul. 17, 2020, provisional application No. 63/040,544, filed on Jun. 18, 2020, provisional application No. 63/040,033, filed on Jun. 17, 2020, provisional application No. 63/035,670, filed on Jun. 5, 2020, provisional application No. 63/034,965, filed on Jun. 4, 2020, provisional application No.

(Continued)

(51) Int. Cl.
*G06K 19/077* (2006.01)

(52) U.S. Cl.
CPC . *G06K 19/07722* (2013.01); *G06K 19/07735* (2013.01); *G06K 19/07747* (2013.01); *G06K 19/07794* (2013.01)

(58) Field of Classification Search
None
See application file for complete search history.

(56) References Cited

U.S. PATENT DOCUMENTS

2015/0221624 A1\* 8/2015 Ye ............................ H01L 24/49
                                                          257/777
2018/0339503 A1\* 11/2018 Finn ..................... H01Q 1/2225
2019/0114526 A1\* 4/2019 Finn ....................... H01Q 21/29

\* cited by examiner

*Primary Examiner* — Kristy A Haupt
(74) *Attorney, Agent, or Firm* — Michael D. Eisenberg

(57) ABSTRACT

A transaction card (smartcard) having a front "continuous" (with no slit) metal layer (ML, CML) with an opening (MO) for a dual-interface transponder chip module (TCM) having a module antenna (MA) on its bond side. A magnetic shielding layer (MSL) comprising ferrite material disposed below the front face continuous metal layer. An amplifying element, booster antenna circuit (BAC) disposed under the magnetic shielding layer. A rear discontinuous metal layer (ML, DML) with a slit (S) and a metal ledge surrounding the module opening to function as a coupling frame (CF). A rear plastic layer formed of non-RF impeding material may support a magnetic stripe and security elements (signature panel and hologram). A portion of the front face continuous metal layer may protrude downward into the magnetic shielding layer and booster antenna circuit layer. The rear discontinuous metal layer may have an additional slit to regulate the activation distance.

19 Claims, 19 Drawing Sheets

Related U.S. Application Data

63/031,571, filed on May 29, 2020, provisional application No. 63/014,142, filed on Apr. 23, 2020, provisional application No. 63/004,491, filed on Apr. 2, 2020, provisional application No. 62/986,612, filed on Mar. 6, 2020, provisional application No. 62/981,040, filed on Feb. 25, 2020, provisional application No. 62/979,440, filed on Feb. 21, 2020, provisional application No. 62/979,422, filed on Feb. 21, 2020, provisional application No. 62/978,826, filed on Feb. 20, 2020, provisional application No. 62/971,927, filed on Feb. 8, 2020, provisional application No. 62/969,034, filed on Feb. 1, 2020, provisional application No. 62/964,138, filed on Jan. 22, 2020, provisional application No. 62/960,178, filed on Jan. 13, 2020, provisional application No. 62/946,990, filed on Dec. 12, 2019, provisional application No. 62/936,519, filed on Nov. 17, 2019, provisional application No. 62/936,543, filed on Nov. 16, 2019, provisional application No. 62/933,526, filed on Nov. 11, 2019, provisional application No. 62/932,506, filed on Nov. 8, 2019, provisional application No. 62/927,157, filed on Oct. 29, 2019, provisional application No. 62/925,255, filed on Oct. 24, 2019, provisional application No. 62/914,485, filed on Oct. 13, 2019, provisional application No. 62/912,701, filed on Oct. 9, 2019, provisional application No. 62/912,077, filed on Oct. 8, 2019, provisional application No. 62/911,236, filed on Oct. 5, 2019, provisional application No. 62/900,566, filed on Sep. 15, 2019, provisional application No. 62/894,976, filed on Sep. 3, 2019, provisional application No. 62/891,433, filed on Aug. 26, 2019, provisional application No. 62/891,308, filed on Aug. 24, 2019, provisional application No. 62/889,555, filed on Aug. 20, 2019, provisional application No. 62/889,055, filed on Aug. 20, 2019, provisional application No. 62/888,539, filed on Aug. 18, 2019, provisional application No. 62/887,696, filed on Aug. 16, 2019, provisional application No. 62/886,978, filed on Aug. 15, 2019, provisional application No. 62/886,370, filed on Aug. 14, 2019.

(FIG. 16B of US 9,836,684 and US 10,193,211)

Shielded Laminated Smartcard

Shielded Laminated Smartcard

RFID ENABLED METAL TRANSACTION CARDS

CROSS-REFERENCES TO RELATED APPLICATIONS

Priority (filing date benefit) is claimed from the following, incorporated by reference herein:

a nonprovisional of 63/160,974 filed 15 Mar. 2021 a continuation-in-part of Ser. No. 17/092,332 filed 9 Nov. 2020
- Ser. No. 17/092,332 is a nonprovisional of 63/004,491 filed 2 Apr. 2020
- Ser. No. 17/092,332 is a nonprovisional of 62/964,138 filed 22 Jan. 2020
- Ser. No. 17/092,332 is a nonprovisional of 62/936,453 filed 16 Nov. 2019
- Ser. No. 17/092,332 is a nonprovisional of 62/932,506 filed 8 Nov. 2019 a continuation-in-part of Ser. No. 17/019,378 filed 14 Sep. 2020
- Ser. No. 17/019,378 is a continuation-in-part of Ser. No. 16/994,558 filed 15 Aug. 2020
  - Ser. No. 16/994,558 is a nonprovisional of 62/912,701 filed 9 Oct. 2019
  - Ser. No. 16/994,558 is a nonprovisional of 62/891,433 filed 26 Aug. 2019
  - Ser. No. 16/994,558 is a nonprovisional of 62/886,978 filed 15 Aug. 2019
- Ser. No. 17/019,378 is a nonprovisional of Ser. No. 16/991,142 filed 12 Aug. 2020
- Ser. No. 17/019,378 is a nonprovisional of 63/053,559 filed 17 Jul. 2020
- Ser. No. 17/019,378 is a nonprovisional of 63/040,544 filed 18 Jun. 2020
- Ser. No. 17/019,378 is a nonprovisional of 63/004,491 filed 2 Apr. 2020
- Ser. No. 17/019,378 is a nonprovisional of 62/979,440 filed 21 Feb. 2020
- Ser. No. 17/019,378 is a nonprovisional of 62/971,927 filed 8 Feb. 2020
- Ser. No. 17/019,378 is a nonprovisional of 62/969,034 filed 1 Feb. 2020
- Ser. No. 17/019,378 is a nonprovisional of 62/964,138 filed 22 Jan. 2020
- Ser. No. 17/019,378 is a nonprovisional of 62/960,178 filed 13 Jan. 2020
- Ser. No. 17/019,378 is a nonprovisional of 62/946,990 filed 12 Dec. 2019
- Ser. No. 17/019,378 is a nonprovisional of 62/936,453 filed 16 Nov. 2019
- Ser. No. 17/019,378 is a nonprovisional of 62/933,526 filed 11 Nov. 2019
- Ser. No. 17/019,378 is a nonprovisional of 62/932,506 filed 8 Nov. 2019
- Ser. No. 17/019,378 is a nonprovisional of 62/927,157 filed 29 Oct. 2019
- Ser. No. 17/019,378 is a nonprovisional of 62/925,255 filed 24 Oct. 2019
- Ser. No. 17/019,378 is a nonprovisional of 62/914,485 filed 13 Oct. 2019
- Ser. No. 17/019,378 is a nonprovisional of 62/912,077 filed 8 Oct. 2019
- Ser. No. 17/019,378 is a nonprovisional of 62/911,236 filed 5 Oct. 2019
- Ser. No. 17/019,378 is a nonprovisional of 62/900,566 filed 15 Sep. 2019
- Ser. No. 17/019,378 is a nonprovisional of 62/894,976 filed 3 Sep. 2019
- Ser. No. 17/019,378 is a nonprovisional of 62/891,308 filed 24 Aug. 2019 a continuation-in-part of Ser. No. 16/993,295 filed 14 Aug. 2020
- Ser. No. 16/993,295 is a continuation-in-part of Ser. No. 16/991,136 filed 12 Aug. 2020
- Ser. No. 16/993,295 is a nonprovisional of 63/053,559 filed 17 Jul. 2020
- Ser. No. 16/993,295 is a nonprovisional of 63/040,544 filed 18 Jun. 2020
- Ser. No. 16/993,295 is a nonprovisional of 63/040,033 filed 17 Jun. 2020
- Ser. No. 16/993,295 is a nonprovisional of 63/035,670 filed 5 Jun. 2020
- Ser. No. 16/993,295 is a nonprovisional of 63/034,965 filed 4 Jun. 2020
- Ser. No. 16/993,295 is a nonprovisional of 63/031,571 filed 29 May 2020
- Ser. No. 16/993,295 is a nonprovisional of 63/014,142 filed 23 Apr. 2020
- Ser. No. 16/993,295 is a nonprovisional of 62/986,612 filed 6 Mar. 2020
- Ser. No. 16/993,295 is a nonprovisional of 62/981,040 filed 25 Feb. 2020
- Ser. No. 16/993,295 is a nonprovisional of 62/979,422 filed 21 Feb. 2020
- Ser. No. 16/993,295 is a nonprovisional of 62/978,826 filed 20 Feb. 2020
- Ser. No. 16/993,295 is a nonprovisional of 62/971,927 filed 8 Feb. 2020
- Ser. No. 16/993,295 is a nonprovisional of 62/969,034 filed 1 Feb. 2020
- Ser. No. 16/993,295 is a nonprovisional of 62/960,178 filed 13 Jan. 2020
- Ser. No. 16/993,295 is a nonprovisional of 62/936,519 filed 17 Nov. 2019
- Ser. No. 16/993,295 is a nonprovisional of 62/912,701 filed 9 Oct. 2019
- Ser. No. 16/993,295 is a nonprovisional of 62/894,976 filed 3 Sep. 2019
- Ser. No. 16/993,295 is a nonprovisional of 62/891,433 filed 26 Aug. 2019
- Ser. No. 16/993,295 is a nonprovisional of 62/891,308 filed 24 Aug. 2019
- Ser. No. 16/993,295 is a nonprovisional of 62/889,555 filed 20 Aug. 2019
- Ser. No. 16/993,295 is a nonprovisional of 62/888,539 filed 18 Aug. 2019
- Ser. No. 16/993,295 is a nonprovisional of 62/887,696 filed 16 Aug. 2019
- Ser. No. 16/993,295 is a nonprovisional of 62/886,978 filed 15 Aug. 2019
- Ser. No. 16/993,295 is a nonprovisional of 62/886,370 filed 14 Aug. 2019

FIELD OF THE INVENTION

This invention relates to the field of metal transaction cards (smartcards) and, more particularly, passive RFID-enabled metal transaction cards having at least one metal layer and operating in contactless mode from one side of the card body.

Some of the disclosure(s) herein may relate to RFID-enabled metal transaction cards having a contactless interface only.

Some of the disclosure(s) herein may relate to metal transaction cards having a fingerprint sensor or a dynamic display.

Some of the disclosure(s) herein may relate to transaction cards made from a material other than metal.

BACKGROUND

There is a growing market demand to have transaction cards with one or several layers of metal. A metal layer provides a desirable weight over conventional plastic cards, and a decorative pattern and/or a reflective metal surface enhances the card's appearance and aesthetic value. This is especially desirable for payment by affluent bank customers. It is therefore desirable to produce dual interface smartcards having a metal layer which operates in contact, but also in contactless mode.

However, a metal layer in a card body construction interferes with the electromagnetic field generated by a contactless reader or terminal thus attenuating the radio-frequency (RF) communication signal between the passive transaction card and the transceiver (reader or terminal).

The prior art suggests using a booster antenna for contactless communication, and a ferrite layer to offset the effects of electromagnetic shielding caused by the metal. Integrating a wire embedded antenna, a ferrite layer and adhesive layers into the card construction significantly impedes upon having a dual interface metal transaction card which has significant weight and a highly sophisticated appearance.

An example of a smartcard with contactless (or dual interface) capability, and having a metal layer and a ferrite layer may be found in US 2013/0126622 (204, FIG. 2A).

An example of a smartcard with contactless (or dual interface) capability, and having a metal layer with a slit in the metal layer may be found in U.S. Pat. No. 9,475,086.

It is therefore an object of the current invention to produce an RFID-enabled metal transaction card comprising a front face metal layer without a slit and a rear synthetic layer, operating in contactless mode from the rear side of the card body with an activation distance greater than (or at least) 4 cm and having drop acoustics which sound like metal.

SOME PATENTS AND PUBLICATIONS OF INTEREST

The following patents and/or publications ("references") may be of interest or relevant to the invention(s) disclosed herein, and some commentary may be provided to distinguish the invention(s) disclosed herein from the following references.

U.S. Pat. No. 9,836,684 (5 Dec. 2017; AmaTech; Finn et al.), incorporated by reference herein, discloses smart cards, payment objects and methods. Smartcards having (i) a metal card body (MCB) with a slit (S) overlapping a module antenna (MA) of a chip module (TCM) or (ii) multiple metal layers (M1, M2, M3) each having a slit (S1, S2, S3) offset or oriented differently than each other. A front metal layer may be continuous (no slit), and may be shielded from underlying metal layers by a shielding layer (SL). Metal backing inserts (MBI) reinforcing the slit(s) may also have a slit (S2) overlapping the module antenna. Diamond like coating filling the slit. Key fobs similarly fabricated. Plastic-Metal-Plastic smart cards and methods of manufacture are disclosed. Such cards may be contactless only, contact only, or may be dual-interface (contact and contactless) cards.

Shielded Laminated Smartcard

FIG. 16B of U.S. Pat. No. 9,836,684 shows a shielded, laminated metal laminated shielded card (SC) 1600B having two coupling frame metal layers and a front face (ML1) which is a continuous metal layer (no slit). Some of the metal layers are the same (or similar) to those shown in the construction of FIG. 16A. Notably different, however, is that the top metal layer (ML1) does not have a slit (there is no "S1" in this embodiment). The second metal layer (ML2) has a slit (S2), and the third metal layer (ML3) has a slit (S3), as in the construction of FIG. 16A, and the various layers may be held together (laminated) with layers of adhesive, as shown. The dimensions of the various layers may be similar to those in the construction of FIG. 16A.

The front face (ML1) 1620A, as shown, does not have a slit, and may interact with the reader electromagnetic field and produce induced eddy currents within its body. These eddy currents will normally produce a counter-field resulting in reduction or blocking of the communication between the transponder chip module and reader. To offset this, a shielding layer (SL) 1640 of suitably chosen magnetic material may be placed between the front continuous metal layer and the coupling frame layers (ML2, ML3) of the card. A layer of adhesive 1622 having a thickness of 20 µm may be disposed between the front metal layer ML1 and the shielding layer SL. A layer of adhesive 1623 having a thickness of 20 µm may be disposed between the shielding layer SL and the second metal layer ML2.

The front metal layer (ML1) may have a thickness of 200 µm, rather than 300 µm (or 320 µm) as in the construction of FIG. 16A. The shielding layer (SL) may have a thickness of approximately 50-200 µm, such as 100 µm (which was gained by making the front layer thinner than in the construction of FIG. 16A). In this manner the coupling frames will be shielded from the attenuating front metal layer and continue to function in conjunction with the transponder chip module (TCM).

Other elements of the FIG. 16B embodiment, such as the second metal layer ML2 and third metal layer ML3 may be substantially similar or identical to corresponding (similarly numbered) elements in the embodiment of FIG. 16A. Generally, the top metal layer ML1 of FIG. 16A is replaced by a metal layer ML1 without a slit and a shielding layer SL.

The module antenna (MA) of the transponder chip module (TCM) may reside in a plane that lies below the continuous front metal layer (ML1). The module antenna (MA) may be surrounded on all edges (sides) by magnetic shielding material (not shown) to reduce the attenuation from eddy currents in the front metal layer (ML1). In this manner the performance of the magnetic shielding material may be maximized and the coupling of the transponder chip module (TCM) with the coupling frame layers (ML2, ML3) may be improved.

U.S. Pat. No. 9,390,366 (12 Jul. 2016; CompoSecure; Herslow et al.) discloses "Metal smart card with dual interface capability", discloses a dual interface smart card having a metal layer includes an IC module, with contacts and RF capability, mounted on a plug, formed of non RF impeding material, between the top and bottom surfaces of the metal layer. The plug provides support for the IC module and a degree of electrical insulation and isolation from the metal layer. The resultant card can have contact and contactless operating capability and an entirely smooth external metal surface except for the contacts of the IC module.

U.S. Pat. No. 9,721,200 (1 Aug. 1, 2017; CompoSecure; Herslow et al.) discloses "Card with metal layer and an antenna", discloses in a smart card having an antenna structure and a metal layer, an insulator layer is formed between the antenna structure and the metal layer to compensate for the attenuation due to the metal layer. The thickness of the insulator layer affects the capacitive coupling between the antenna structure and the metal layer and is selected to have a value which optimizes the transmission/reception of signals between the card and a card reader.

U.S. Pat. No. 9,898,699 (20 Feb. 2018; CompoSecure; Herslow et al.) discloses "Smart metal card with radio frequency (RF) transmission capability", discloses ferrite material utilized in a smart metal card as a shield between a metal layer and an antenna does not occupy a complete layer. Instead, only sufficient ferrite material is utilized to track and conform to the antenna.

U.S. Pat. No. 10,089,570 (2 Oct. 2, 2018; CompoSecure; Herslow et al.) discloses "Card with metal layer and an antenna", discloses in a smart card having an antenna structure and a metal layer, an insulator layer is formed between the antenna structure and the metal layer to compensate for the attenuation due to the metal layer. The thickness of the insulator layer affects the capacitive coupling between the antenna structure and the metal layer and is selected to have a value which optimizes the transmission/reception of signals between the card and a card reader.

U.S. Pat. No. 10,275,703 (30 Apr. 2019; CompoSecure; Herslow et al.) discloses "Smart metal card with radio frequency (RF) transmission capability", discloses RF shielding material utilized in a smart metal card as a shield between a metal layer and an antenna does not occupy a complete layer. Instead, only sufficient RF shielding material is utilized to track and conform to the antenna.

U.S. Pat. No. 10,289,944 (14 May 2019; CompoSecure; Herslow et al.) discloses "Metal smart card with dual interface capability", discloses a dual interface smart card having a metal layer includes an SC module, with contacts and RF capability, mounted on a plug, formed of non RF impeding material, between the top and bottom surfaces of the metal layer. The plug provides support for the IC module and a degree of electrical insulation and isolation from the metal layer. The resultant card can have contact and contactless operating capability and an entirely smooth external metal surface except for the contacts of the IC module.

U.S. Pat. No. 10,318,859 (11 Jun. 2019; CompoSecure; Lowe et al.) discloses "Dual interface metal smart card with booster antenna", discloses a card having a metal layer and an opening or cut-out region in the metal layer, with a dual-interface integrated circuit (IC) module disposed in the opening or cut-out region. A ferrite layer is disposed below the metal layer and a booster antenna is attached to the ferrite layer. A vertical hole extends beneath the IC module through the ferrite layer. The booster antenna may be physically connected to the IC module or may be configured to inductively couple to the IC module. In some embodiments, the IC may be disposed in or on a non-conductive plug disposed within the opening or cut-out region, or the vertical hole may have a non-conductive lining, or a connector may be disposed between the booster antenna and the IC module in the vertical hole.

U.S. Pat. No. 10,534,990 (14 Jan. 2020; CompoSecure; Herslow et al.) discloses "Metal smart card with dual interface capability", discloses a dual interface smart card, and methods for the manufacture thereof, having a metal layer, an IC module, with contacts and RF capability, and a plug formed of non RF impeding material, disposed in the metal layer. The plug provides support for the IC module and a degree of electrical insulation and isolation from the metal layer. Embodiments of the card include at least one additional layer.

U.S. Pat. No. 10,748,049 (18 Aug. 2020; CompoSecure; Herslow et al.) discloses "Metal smart card with dual interface capability", discloses a smart card having a metal layer, an opening in the metal layer and a dual interface integrated circuit (IC) module and a plug non-RF-impeding material mounted in the opening, with at least one at least one additional layer stacked relative to the plug.

US 2020/0364532 (19 Nov. 2020; CompoSecure; Herslow et al.) discloses "Metal smart card with dual interface capability", discloses a transaction card comprising a metal layer. A first cut out region in a first surface of said metal layer has a depth less than the thickness of the metal layer, and a first portion of an integrated circuit (IC) module is secured therein. A second cut out region extends from the first cut out region to the second surface of said metal layer and defines a non-RF-impeding volume having a perimeter greater than the perimeter of the first cut out region. One or more additional layers are stacked on the second surface of the metal layer, and a channel extends between one of the stacked layers and the IC module.

US 2020/0151535 (14 May 2020; CompoSecure; Herslow et al.) discloses "Metal smart card with dual interface capability", discloses a smart card having a metal layer, an opening in the metal layer and a dual interface integrated circuit (IC) module and a plug non-RF-impeding material mounted in the opening, with at least one at least one additional layer stacked relative to the plug.

US 2019/0354825 (21 Nov. 2019; CompoSecure; Lowe) discloses "Metal dual interface card", discloses a dual interface transaction card includes a metal card body having first and second surfaces. A contact-only transaction module is secured in the card body, the contact-only transaction module including contact pads disposed on the first surface of the card body and including a first transaction circuit. A contactless transaction module is secured in a void in the metal card body. The contactless transaction module includes a second transaction circuit and an antenna. Also disclosed is a process for manufacturing the dual interface transaction card. The process includes the steps of constructing a metal card body having the first and second surfaces, securing the contact-only transaction module in the metal card body, forming the void in the metal card body, and securing the contactless transaction module in the void.

SOME ADDITIONAL REFERENCES

The following patents and/or publications ("references") may be of interest or relevant to the invention(s) disclosed herein, and some commentary may be provided to distinguish the invention(s) disclosed herein from the following references.

U.S. Pat. No. 10,599,972 Smartcard constructions and methods
U.S. Pat. No. 10,552,722 Smartcard with coupling frame antenna
U.S. Pat. No. 10,518,518 Smart cards with metal layer(s) and methods of manufacture
U.S. Pat. No. 10,248,902 Coupling frames for RFID devices
U.S. Pat. No. 10,193,211 Smartcards, RFID devices, wearables and methods
U.S. Pat. No. 9,960,476 Smart card constructions
U.S. Pat. No. 9,836,684 Smart cards, payment objects and methods U.S. Pat. No. 9,697,459 Passive smartcards, metal cards, payment objects and smart jewelry
U.S. Pat. No. 9,812,782 Coupling frames for RFID devices
U.S. Pat. No. 9,390,364 Transponder chip module with coupling frame on a common substrate for secure and non-secure smartcards and tags
U.S. Pat. No. 9,489,613 RFID transponder chip modules with a band of the antenna extending inward
U.S. Pat. No. 9,634,391 RFID transponder chip modules
U.S. Pat. No. 9,622,359 RFID transponder chip modules
U.S. Pat. No. 9,798,968 Smartcard with coupling frame and method of increasing activation distance of a transponder chip module
U.S. Pat. No. 9,475,086 Smartcard with coupling frame and method of increasing activation distance of a transponder chip module
2018/0339503 Smartcards with metal layer(s) and methods of manufacture
2018/0341846 Contactless metal card constructions
2019/0114526 Smartcard constructions and methods
2019/0171923 Metallized smartcard constructions and methods
2019/0197386 Contactless smartcards with multiple coupling frames
2019/0392283 RFID transponder chip modules, elements thereof, and methods
2020/0005114 Dual interface metal hybrid smartcard
2020/0034578 Smartcard with display and energy harvesting
2020/0050914 Connection bridges for dual interface transponder chip modules
2020/0151534 Smartcards with metal layers and methods of manufacture
2020/0226443 Smartcard with a booster antenna and a wireless connection between modules
2020/0250504 Manufacturing metal inlays for dual interface metal cards
2020/0250506 Smartcard constructions and methods
2020/0257953 Contactless smartcards with coupling frames
2020/0327387 Smartcard with a coupling frame and a wireless connection between modules
2020/0387768 Contactless metal card constructions
2021/0056374 Transponder chip module with module antenna(s) and coupling frame(s)
2021/0056375 Smart cards with metal layer(s) and methods of manufacture
2021/0049431 Metal-containing dual interface smartcards
2021/0049439 Contactless metal cards with fingerprint sensor and display
2021/0073608 Dual interface metal cards and methods of manufacturing
2021/0081743 Dual interface metal cards and methods of manufacturing
2021/0081748 Proximity and dual interface metal cards and methods of making card bodies with two metal layers

SOME FURTHER ADDITIONAL REFERENCES

U.S. Pat. No. 6,452,563 (17 Sep. 2002; Gemplus aka Gemalto; Porte)
U.S. Pat. No. 6,491,229 (10 Dec. 2002; NJC Innovations; Berney)
U.S. Pat. No. 7,306,163 (11 Dec. 2007; IBM; Scholz et al.)
U.S. Pat. No. 8,186,582 (29 May 2012; American Express; Varga et al.)
U.S. Pat. No. 8,523,062 (3 Sep. 2013; American Express; Varga et al.)
U.S. Pat. No. 8,393,547 (12 Mar. 2013; Perfect Plastic Printing; Kiekhaefer et al.)
U.S. Pat. No. 8,608,082 (17 Dec. 2013; Oberthur Technologies, aka IDEMIA; La Garrec et al.)
U.S. Pat. No. 8,737,915 (27 May 2014; J.H. Tonnjes E.A.S.T.; Beenken)
U.S. Pat. No. 9,024,763 (5 May 2015; Hamedani Soheil)
U.S. Pat. No. 9,299,020 (29 Mar. 2016; TheCard; Zimmerman et al.)
U.S. Pat. No. 9,390,366 (12 Jul. 2016; CompoSecure; Herslow et al.)
U.S. Pat. No. 9,564,678 (7 Feb. 2017; Murata Manufacturing; Kato et al.)
Reference is also made to U.S. Pat. Nos. 8,976,075 and 9,203,157.
U.S. Pat. No. 9,721,200 (1 Aug. 2017; CompoSecure; Herslow et al.)
U.S. Pat. No. 9,760,816 (12 Sep. 2017; American Express; Williams et al.)
U.S. Pat. No. 9,836,687 (5 Dec. 2017; American Express; Williams et al.)
U.S. Pat. No. 9,898,699 (20 Feb. 2018; CompoSecure; Herslow et al.)
U.S. Pat. No. 10,140,569 (27 Nov. 2018; Kim et al.)
U.S. Pat. No. 10,089,570 (2 Oct. 2018; CompoSecure; Herslow et al.)
U.S. Pat. No. 10,275,703 (30 Apr. 2019; CompoSecure; Herslow et al.)
U.S. Pat. No. 10,289,944 (14 May 2019; CompoSecure; Herslow et al.)
U.S. Pat. No. 10,318,859 (11 Jun. 2019; CompoSecure; Lowe, et al.)
U.S. Pat. No. 10,445,636 (15 Oct. 2019; Giesecke & Devrient; Virostek et al.)
U.S. Pat. No. 10,534,990 (14 Jan. 2020; CompoSecure; Herslow et al.)
U.S. Pat. No. 10,583,683 (10 Mar. 2020; Federal Card Services; Ridenour et al.)
US 2020/0164675 (28 May 2020; FCS; Ridenour et al.)
US 2011/0181486 (28 Jul. 2011; Murata; Kato)
US 2012/0112971 (10 May 2012; Panasonic; Takeyama et al.)
US 2013/0126622 (23 May 2013; AmaTech; Finn)
US 2015/0206047 (23 Jul. 2015; CompoSecure; Herslow)
US 2019/0050706 (14 Feb. 2019; CompoSecure; Lowe) now U.S. Pat. No. 10,406,734
US 2019/0073578 (7 Mar. 2019; CompoSecure; Lowe et al.)
US 2019/0160717 (30 May 2019; CompoSecure; Lowe)
US 2019/0286961 (19 Sep. 2019; CompoSecure; Lowe)
US 2019/0291316 (now U.S. Pat. No. 10,583,594).
US 2019/0156994 (23 May 2019; X-Card Holdings; Cox)
US 2019/0236434 (1 Aug. 2019; CompoSecure; Lowe)
US 2014/0231503 (21 Aug. 2014; Smart Co.; Kunitaka)
US 2019/0311235 (10 Oct. 2019; Giesecke & Devrient; Sexl et al.)
US 2019/0311236 (10 Oct. 2019; Giesecke & Devrient; Sexl et al.)
US 2019/0384261 (19 Dec. 2019; Kona I; Nam et al.)
US 2019/0354825 (21 Nov. 2019; CompoSecure; Lowe)
Chen, S. L., Kuo, S. K. and Lin C. T. (2009) incorporated by reference herein, discloses "A metallic RFID tag design for steel-bar and wire-rod management application in the steel industry" (Progress in Electromagnetics Research, PIER Vol. 91: pp. 195-212.)
EP 2372840 (25 Sep. 2013; Panasonic; Hashimoto)
CN 205158409U (13 Apr. 2016)
WO 2017/090891 (1 Jun. 2017; Biosmart; Yoon et al.)

KR 10-1754985 (30 Jun. 2017; Aichi CK Corporation aka ICK; Kim et al.)
PCT/US2019/020919 (12 Sep. 2019; X-Card Holding; Cox)
US 2019/0114526 (18 Apr. 2019; Finn et al.)
US 2019/0171923 (6 Jun. 2019; Finn)
US 2016/0180212 (23 Jun. 2016; Herslow et al)
US 2004/0118930 (24 Jun. 2004; American Express; Berardi et al.)
WO 2018/132404 (19 Jul. 2018; CompoSecure, LLC)
WO 2017/162311 (28 Sep. 2017; Zwipe AS)
WO 2017/177905 (19 Oct. 2017; Hightec Tech)
US 2014/0091149 (3 Apr. 2014; Finn et al.)
US 2013/0126622 (23 May 2013; Finn)
U.S. Pat. No. 3,214,324 (26 Oct. 1965; General Mills; Peerman)

SOME FURTHER REFERENCES

The following references may also be applicable to the invention(s) disclosed herein:
U.S. Pat. Nos. 6,581,839, 6,749,123, 6,764,014, 7,306,158, 7,377,443, 7,607,583, 7,837,116, 8,066,190, 8,186,598, 7,494,057, 7,530,491, 7,819,310, 7,823,777, 7,971,786, 8,033,457, 8,079,514, 8,186,582, 8,523,062, 9,760,816, 9,836,687
D436,620, D438,562, D438,563, D 442,222, D442,627, D442,628, D442,629, D443,298, D447,515, D449,336, D507,298, D507,598, D508,261 D510,103, D512,095, D523,471, D525,298, D525,653, D525,654, D526,013, D526,014, D526,015, D526,016, D527,421 and D529, 955, D569,423, D572,305, D578,569, D579,044 and D593,600.

Some Definitions

Some of the following terms may be used or referred to, herein.

Eddy Currents

Eddy currents are induced electrical currents that flow in a circular path. In other words, they are closed loops of induced current circulating in planes perpendicular to the magnetic flux. Eddy currents concentrate near the surface adjacent to the excitation coil of the contactless reader generating the electromagnetic field, and their strength decreases with distance from the transmitter coil. Eddy current density decreases exponentially with depth. This phenomenon is known as the skin effect. The depth that eddy currents penetrate into a metal object is affected by the frequency of the excitation current and the electrical conductivity and magnetic permeability of the metal.

Skin Depth

Skin effect is the tendency of an alternating electric current (AC) to become distributed within a conductor such that the current density is largest near the surface of the conductor, and decreases with greater depths in the conductor. The electric current flows mainly at the "skin" of the conductor, between the outer surface and a level called the skin depth. The skin effect causes the effective resistance of the conductor to increase at higher frequencies where the skin depth is smaller, thus reducing the effective cross-section of the conductor. The skin effect is due to opposing eddy currents induced by the changing magnetic field resulting from the alternating current.

Eddy Currents and a Slit in a Metal Layer or Metal Card Body

A discontinuity interrupts or alters the amplitude and pattern of the eddy currents which result from the induced electromagnetic field generated by a contactless point of sale terminal. The eddy current density is highest near the surface of the metal layer (ML) and decreases exponentially with depth.

RFID Slit Technology

Providing a metal layer in a stack-up of a card body, or an entire metal card body, to have a module opening (MO) for receiving a transponder chip module (TCM) and a slit (S) to effectuate contactless communication with the card—in other words, a "coupling frame"—may be described in greater detail in U.S. Pat. Nos. 9,475,086, 9,798,968, and in some other patents that may be mentioned herein. In some cases, a coupling frame (CF) may be formed from a metal layer (ML) or metal card body (MCB) having a slit (S), without having a module opening (MO). A typical slit may have a width of approximately 100 μm. As may be used herein, a "micro-slit" refers to a slit having a smaller width, such as approximately 50 μm, or less.

"RFID Slit Technology" refers to modifying a metal layer (ML) or a metal card body (MCB) into a so-called "antenna circuit" by providing a discontinuity in the form of a slit, slot or gap in the metal layer (ML) or metal card body (MCB) which extends from a peripheral edge to an inner area or opening of the layer or card body. The concentration of surface current at the inner area or opening can be picked up by another antenna (such as a module antenna) or antenna circuit by means of inductive coupling which can drive an electronic circuit such as an RFID chip attached directly or indirectly thereto. The slit may be ultra-fine (typically less than 50 μm or less than 100 μm), cut entirely through the metal with an IR laser, with the debris from the plume removed by ultrasonic or plasma cleaning. Without a cleaning step after lasing, the contamination may lead to shorting across the slit. In addition, the slit may be filled with a dielectric to avoid such shorting during flexing of the metal forming the transaction card. The laser-cut slit may be further reinforced with the same filler such as a resin, epoxy, mold material, repair liquid or sealant applied and allowed to cure to a hardened or flexible state. The filler may be dispensed or injection molded. The term "slit technology" may also refer to a "coupling frame" with the aforementioned slit, or to a smartcard embodying the slit technology or having a coupling frame incorporated therein.

Coupling Frame

Generally, a "coupling frame" (CF) may comprise a metal layer, metal frame, metal plate or any electrically-conductive medium or surface with an electrical discontinuity such as in the form of a slit (S) extending from an outer edge of the layer to an inner position thereof, the coupling frame (CF) capable of being oriented so that the slit (S) overlaps (crosses-over) the module antenna (MA) of the transponder chip module (TCM), such as on at least one side thereof. The slit (S) may be straight and may have a width and a length. The slit (S) may extend to an opening (MO) for accepting the transponder chip module. There may only be a slit, and no opening for the transponder chip module (TCM). Coupling frames of this type, typically a layer of metal with an opening for receiving a transponder chip module, and a slit extending from a periphery of the layer to the opening, wherein the slit overlaps at least a portion of the module antenna, may be found in the following U.S. Pat. Nos. 9,812,782; 9,390,364; 9,634,391; 9,798,968 and 9,475,086.

Module Antenna (MA)

This is an antenna structure (AS) located on the face-down-side of a transponder chip module (TCM) or dual interface chip module (DI chip module) for inductive coupling with an in-card booster antenna (BA) or coupling frame (CF). The antenna structure (AS) is usually rectangular in shape with dimensions confined to the size of the module package having 6 or 8 contact pads on the face-upside. The termination ends of the antenna structure (AS) with multiple windings (e.g. 13 to 15 turns depending on the input capacitance of the RFID chip) based on a frequency of interest (e.g. 13.56 MHz) are bonded to the connection pads ($L_A$ and $L_B$) on the RFID chip. In the case of a coupling frame (CF) smartcard such as a dual interface metal core transaction card, the module antenna (MA) overlaps the coupling frame or metal layer(s) within the card body at the area of the module opening to accept the transponder chip module (TCM).

Booster Antenna

A booster antenna (BA) in a smartcard comprises a card antenna (CA) component with multiple turns or windings extending around the periphery edge of the card body (CB), a coupler coil (CC) component at a location for a module antenna (MA) of a transponder chip module (TCM), and an extension antenna (EA) component contributing to the inductance and tuning of the booster antenna (BA). A conventional booster antenna is a wire embedded antenna, ultrasonically scribed into a synthetic layer forming part of the stack-up construction of a dual interface smartcard. The card antenna (CA) on the periphery of the card body (CB) inductively couples with the contactless reader while the coupler coil (CC) inductively couples with the module antenna (MA) driving the RFID chip. US 2014/0091149 (3 Apr. 2014; Finn, et al.) provides an example of a booster antenna (BA) for a smart card.

Coupling Frame Antenna (CFA)

A metal layer or metal card body with a discontinuity may be represented by card size planar antenna having a single turn, with the width of the antenna track significantly greater than the skin depth at the frequency of interest.

Compensating Loop (CL)

To stabilize the resonance frequency of a booster antenna (BA), a metal compensating loop (CL) with a gap may be assembled underneath the booster antenna BA. A ferrite layer or layers may also be laminated together, in combination with the compensating loop CL on the reverse side of the booster antenna BA. Reference is made to US 2013/0126622 (FIG. 4A).

Discontinuous Metal Frame (DMF)

It is an "open loop" metal frame (DMF) disposed around a peripheral area of a card body with a booster antenna (BA) disposed inside the internal area of the metal frame. The "open loop" metal frame may comprise a slit (S) or gap which may extend from an inner edge to an outer edge of the metal frame, and the booster antenna (BA) disposed inside the internal area of the metal frame. The gap may provide a means for tuning the resonant frequency of the booster antenna. Insulating layers may be disposed on at least one side of the metal frame, covering the slit (S), and may comprise a dielectric medium such as an oxide layer. Reference is made to US 2015/0269477 (FIG. 2H).

Metal Edge and Metal Ledge in a Continuous Metal Layer/Booster Antenna Circuit/Coupling Frame Constellation For optimum radio frequency (RF) performance of a metal transaction card with an embedded dual interface transponder chip module (TCM) or an inductive coupling chip module (ICM) with a module antenna (MA) connected to an RFID chip, having an in-card booster antenna circuit (BAC) with a card antenna (CA) component with multiple windings extending around the perimeter edge of the card body (CB) and a coupler coil (CC) component with multiple windings located at an area destined for the transponder chip module (TCM), with the in-card booster antenna circuit (BAC) residing on a magnetic shielding layer sandwiched between a front face metal layer without a slit (continuous metal layer) and a rear metal layer acting as a card body coupling frame (CF) with a slit (S) and a module opening (MO) (discontinuous metal layer), the proximity and overlap of the antenna structures (AS) of the transponder chip module (TCM), booster antenna circuit (BAC) and coupling frame (CF), to the metal edges of the metal card body (MCB) and the metal ledges within the metal card body (MCB) become critical in maximizing the harvesting of the surface currents to drive the RFID chip.

The proximity in terms of spatial distance of the card antenna (CA) component of the booster antenna circuit (BAC) to the metal edge of the card body coupling frame (CF), the discontinuous metal layer with a slit (S) and module opening (MO), plays a significant role in capturing surface currents flowing around the metal edges of the card body (CB) and directing them to the coupler coil (CC) component for inductive coupling with the module antenna (MA) of the transponder chip module (TCM). As the surface currents decay with distance away from the metal edges to the inner area of the coupling frame (CF) because of the skin effect, the card antenna (CA) component with multiple windings has to be routed as near as possible to the perimeter edge of the metal card body (i.e. coupling frame). Notably, there are negligible surface current flows in the center of the coupling frame (CF), because of the exponential decay resulting from the skin effect.

The dimensional width of the windings (or the width across multiple windings) of the coupler coil (CC) component of a booster antenna circuit (BAC) ought to overlap a metal ledge in the module opening (MO) of the coupling frame (CF) by approximately 50% to maximize the pick-up of surface currents. Simultaneously, the windings of the coupler coil (CC) component ought to overlap the windings of the module antenna (MA) of the transponder chip module (TCM) by approximately 50% to optimize inductive coupling.

The same applies to the windings of the module antenna (MA) of the transponder chip module (TCM) which ought to overlap the metal ledge in the module opening (MO) of the coupling frame (CF) by approximately 50% to capture the surface currents. In other words, the dimensional width of the windings of the module antenna (MA) ought to overlap the metal ledge ($P_1$) of the stepped cavity forming the module pocket in a metal transaction card body by approximately 50%. As the shape and form of the antennas may change, the dimensional width of the windings may be replaced by a surface area or operating field volume calculation.

The booster antenna circuit (BAC) components may reside on a single side or on both sides of a dielectric or carrier layer. The antenna structures (AS) may be layered, for example the windings of the card antenna (CA) may be layered on top of each other at the perimeter edges of the card body (CB) to increase the density of the antenna windings in proximity to the metal edges. The layered antenna may have counter windings to tune the resonance frequency and reactive elements (inductance and capacitance). Capacitive features like parallel plates may be integrated into the circuitry using vertical interconnects and jumpers for electrical interconnection of the antenna components. Further, the booster antenna circuit (BAC) may include an extension antenna (EA) or a coupling frame antenna (CFA) component.

Polyethylene Naphthalate (PEN)

It is a high-performance, crystal clear thermoplastic made from naphthalene-2,6-dicarboxylic acid and ethylene glycol. PEN has many attractive properties including high tensile strength, low heat shrinkage, excellent dimensional stability, low moisture absorption, and good retention of physical properties over a fairly wide temperature range. Its oxygen barrier, hydrolytic stability, and tensile strength surpass those of PET films. It also has superior UV resistance, excellent electrical properties, much lower heat shrinkage, good optical clarity and high gloss but only moderate moisture barrier properties. It has a relative high melting point and glass transition temperature (120° C.), which makes it suitable for applications that require sterilization at high temperatures. Typical grades have a continuous service temperature of about 160° C.

Thermosetting Resin

A thermosetting resin, or thermoset, is a polymer which cures or sets into a hard shape using curing method such as heat or radiation. The curing process is irreversible as it introduces a polymer network crosslinked by covalent chemical bonds.

Upon heating, unlike thermoplastics, thermosets remain solid until temperature reaches the point where thermoset begins to degrade.

Phenolic resins, amino resins, polyester resins, silicone resins, epoxy resins, and polyurethanes (polyesters, vinyl esters, epoxies, bismaleimides, cyanate esters, polyimides and phenolics) are few examples of thermosetting resins.

Thermoset Adhesives

Thermoset adhesives are crosslinked polymeric resins that are cured using heat and/or heat and pressure. They represent a number of different substances that undergo a chemical reaction when curing, such that the structure formed has superior strength and environmental resistance.

Despite their name, thermosets may or may not require heat to cure and may instead use irradiation or electron beam processing. Due to their superior strength and resistance, thermosets are widely used for structural load-bearing applications.

B-staged Epoxy Resin

This is a descriptive term used to define a one component epoxy system, using a latent (low reactivity) curing agent. This unique product can be partially cured (sometimes referred to as "pre-dried"), as an initial stage after being applied onto one substrate/surface. It can, at a later time, be completely cured under heat and pressure.

Partially cured epoxy, or B-staged epoxy adhesive, does have processing advantages. The adhesive can have its initial application and partial cure in one location, and its final cure in another location weeks later.

C-staged Epoxy Resin

The B stage is a solid, thermoplastic stage. When given additional heat, the B-stage epoxy will flow and continue to cure to a crosslinked condition or C stage.

Intermediate Bonding of a Thermosetting Epoxy

In the card stack-up lamination process, it may be desirable before the irreversible C-stage lamination step to slightly bond or tack a B-stage adhesively coated synthetic layer to another synthetic layer, ferrite layer or metal layer by using a temperature which is below the crosslinked curing temperature. For example, at pre-press or collation, a synthetic layer with an adhesive backing may be lightly bonded or fixed (at 90° C.) to a magnetic layer with a peeling off strength of <1 N/cm, however post lamination at the C-Stage curing temperature (for 20 min@120° C.) the peeling off strength is >6 N/cm.

Digital Printing of Ultra-Violet Ink

UV printing is a form of digital printing that uses ultra-violet light to dry or cure ink as it is printed. As the printer distributes ink on the surface of a material (called a "substrate"), specially designed UV lamps follow close behind, curing—or drying—the ink instantly. A primer coat may be used to prime the substrate surface to enhance adhesion.

UV-flexible (stretchable) ink is a liquid which consists of monomers, colorant, additives, photoinitiator and stabilizer. UV hard (rigid) ink comprises for example of the following elements: acryl acid ester, 1,6-hexanediol diacrylate initiator, additive and quinacridone series pigment. The primer is made up of aliphatic monomer, acrylic oligomer, aromatic monomer, additives and photoinitiator.

Moisture curing inks which cure over many days (typically 3 to 5 days) or hybrid mixtures of ink and an additive (catalyst) in a ratio of parts e.g. four to one, may not need a primer.

Laser Reactive Protective Coating

An acrylic solvent with a thickness of 10-20 µm may be coated to a metal decorative surface. The coating may be gloss or matte and can be laser marked for personalizing the front surface of a metal card. Glossy clear overprint is typically a UV curable ink specifically formulated for use on polyester and vinyl coated metal substrates applied by a roller coating or screen-printing machine with a thickness of 10-20 µm, depending on the number passes and machine settings. Matte overprint is typically a UV curable matte digital coating applied by a roller coating machine with a thickness of 10-20 μm.

SUMMARY

The invention may relate to innovations in or improvements to RFID-enabled metal-containing transaction cards.

The invention may relate to some improvements in the manufacturing, performance and/or appearance of smartcards (also known as transaction cards), such as metal transaction cards and, more particularly, to RFID-enabled smartcards (which may be referred to herein simply as "cards") having at least contactless capability, including dual interface (contactless and contact) smartcards, including cards having a metal layer in the stackup of their card body, and including cards having a card body which is substantially entirely formed of metal (i.e., a metal card body).

The invention may relate to innovations in or improvements to RFID-enabled ("contactless capable) metal smartcards or metal transaction cards with/having Metal Inlay to Metal Card Body and various stack-up constructions.

It is an object of the invention(s), as may be disclosed in various embodiments presented herein, to provide improvements in the manufacturing, performance and/or appearance of smartcards (also known as transaction cards), such as metal transaction cards and, more particularly, to RFID-enabled smartcards (which may be referred to herein simply as "cards") having at least contactless capability, including dual interface (contactless and contact) smartcards, including cards having a metal layer in the stack-up of their card body, and including cards having a card body which is substantially entirely formed of metal (i.e., a metal card body).

The smartcards (transaction cards) disclosed herein may be "one-sided", in that they may only operate in contactless mode when the back (rear) side of the card is presented to an external reader, such as a contactless POS (point of sale) terminal. The front of the card has a continuous metal layer, without a slit, and therefore cannot function well in contactless mode. A shielding layer and an amplifying element may be disposed behind the front metal layer to enable contactless functionality when the back side of the card is presented to the reader.

It is an object of the invention to produce a robust metal transaction card having a front face continuous metal layer and a rear face discontinuous metal layer, with the metal layers sandwiching a magnetic shielding layer and a booster antenna circuit having a coupler coil and a perimeter coil. The contactless functionality of the transaction card operates from the rear side of the metal card body. To enhance RF performance, the module antenna of the transponder chip module, the coupler coil of the booster antenna circuit and the metal ledge surrounding the module opening in the discontinuous metal layer overlap each other and are aligned concentric to one another. The perimeter coil with multiple turns is routed along the edge of the discontinuous metal layer to pick up surface currents to power the dual interface chip module via the coupler coil by means of inductive coupling. To further enhance the RF performance in terms of activation distance, the discontinuous metal layer with a slit which terminates in a module opening, may be accommodated by at least one additional slit arranged on the opposite side of the metal card body.

According to the invention, generally, a transaction card having a front "continuous" (with no slit) metal layer (930, 1130) with an opening (912, 1112) for a dual-interface transponder chip module (910, 1110) having a module antenna (911, 1111) on its bond side (not shown). A magnetic shielding layer (942, 1142) comprising ferrite material disposed below the front face continuous metal layer. An amplifying element, booster antenna circuit (944, 1144) disposed under the magnetic shielding layer. A rear discontinuous metal layer (950, 1150) with a slit (920, 1120) and a metal ledge (916, 1116) surrounding a module opening (914, 1114) to function as a coupling frame (CF). A rear plastic layer (960, 1160) formed of non-RF impeding material may capture a magnetic stripe and security elements (signature panel and hologram). A portion of the front face continuous metal layer may protrude downward into the magnetic shielding layer and booster antenna circuit layer. The rear discontinuous metal layer may have an additional slit to regulate the activation distance.

The antenna structures of the module antenna, coupler coil and the metal ledge of the module opening with slit in the rear discontinuous metal layer may be concentric to one another. The metal card body (MCB) may have two metal layers (continuous and discontinuous) of different materials sandwiching the electronic component elements, adhesively joined to each other using a thermosetting epoxy that converts from B-stage to C-stage during lamination.

According to some embodiments (examples) of the invention, a smartcard, capable of at least contactless operation, may comprise: a front face continuous metal layer (ML) without a slit and having a first module opening (MO); a rear discontinuous metal layer (ML, 950, 1150) having a metal ledge surrounding a second module opening (MO) and a slit (S); a transponder chip module (TCM) with a module antenna (MA); and an assembly of a magnetic shielding layer (MSL) and a booster antenna circuit (BAC) disposed between the front face continuous metal layer and the rear discontinuous metal layer.

The magnetic shielding layer may be disposed behind the front face continuous metal layer. The booster antenna circuit may be disposed behind the magnetic shielding layer.

The booster antenna circuit may comprise a perimeter coil (PC) and a coupler coil (CC). The booster antenna circuit may comprise a closed loop circuit with no open-ended antenna elements. An integrated parallel plate capacitor bank comprising upper electrodes (UE) and lower electrodes (LE) may be attached in parallel to the perimeter coil and the coupler coil for frequency trimming.

The module antenna (MA) of the transponder chip module (TCM) may be arranged concentrically to overlap the coupler coil (CC) of the booster antenna circuit (BAC) and a metal ledge surrounding the module opening (MO) in the rear discontinuous metal layer.

The underside of the front face continuous metal layer may have a protruding boss which extends through the card assembly to the rear discontinuous metal layer. The protruding boss may add weight to the smartcard, may enhance a metal sound of the card (when tapped on a table, for example), and may provide for mechanical robustness.

The rear discontinuous metal layer (ML) with a slit (S) which terminates in a module opening (MO), may be accommodated by at least one additional slit arranged on another (such as the opposite) side of the discontinuous metal layer (to enhance the activation distance).

According to some embodiments (examples) of the invention, a smartcard (SC) may comprise: a front face continuous metal layer and a rear discontinuous metal layer sandwiched together with thermosetting epoxy, and electronic component elements disposed between the front and rear layers.

The thermosetting epoxy may be applied in B-stage, and converts to C-stage after a lamination process involving selected temperature and pressure.

According to some embodiments (examples) of the invention, a smartcard may comprise a stack-up of: a front face continuous metal layer and a rear discontinuous metal layer sandwiching electronic component elements (magnetic shielding layer and a booster antenna circuit); wherein the front face continuous metal layer has a top side which has primer and flexible or rigid ink applied to its metal surface by means of digital printing to produce graphics; wherein the graphics are protected by a hard coat layer (rigid ink) which is digitally printed over the flexible or rigid ink; wherein the graphics are further protected by gloss or matte coating (screen-printed or roller coated) layer disposed over the hard coat layer and protecting the surface from scratches.

The exposed protective coating may be a laser-reactive layer which can receive personalization data by means of laser marking.

According to some embodiments (examples) of the invention, a smartcard, may comprise: a front metal layer (ML) without a slit and having a first module opening (MO); a rear metal layer (ML) having a second module opening (MO) and a slit (S); and a booster antenna circuit (BAC) disposed between the front face metal layer and the rear metal layer. The booster antenna circuit (BAC) may comprise a perimeter coil and a coupler coil. Outer windings of the perimeter coil may be arranged to be as close as possible to an outer peripheral edge of the rear metal layer, such as within 500 μm of the outer edge. At least some windings of the perimeter coil may overlap the slit. A metal ledge may surround the second module opening. The coupler coil may overlap the metal ledge.

A magnetic shielding layer may be disposed between the front metal layer and the rear metal layer.

A transponder chip module (TCM) may be disposed in the module openings. The transponder chip module may have a module antenna (MA), and may also have contact pads (CP) for dual interface (DI) capability. The transponder chip module (TCM) may be disposed in the module openings of the various layers of the card.

The card may further comprise frequency trimming capacitor electrodes (1044D and 1044E).

According to some embodiments (examples) of the invention, the card body of a smartcard may comprise a stack-up of layers, including: a front face continuous metal layer having a first module opening (MO) and a first metal ledge to mechanically support a transponder chip module (TCM) having a module antenna (MA); a magnetic shielding layer (MSL) disposed behind the front face continuous metal layer (CML); a booster antenna circuit (BAC) disposed behind the magnetic shielding layer; and a rear discontinuous metal layer (DML) having a second module opening (MO), a second metal ledge with a metal edge surrounding the module opening (MO) and a slit (S). The front face continuous metal layer does not have a slit extending from a peripheral edge of the front face metal layer to the first module opening. In addition, the front face continuous metal layer and the rear discontinuous metal layer sandwich the assembly of the magnetic shielding layer and booster antenna circuit. The booster antenna circuit may be arranged on a carrier layer such as a PET substrate with the perimeter coil on one side and the coupler coil on the other side. The discontinuous metal layer may have a second slit or a combination of slits to increase the activation distance in contactless mode.

An adhesive layer (1138) may be disposed between the front face continuous metal layer and the magnetic shielding layer (1142). The rear discontinuous metal layer (1150) may be disposed behind the booster antenna circuit (BAC: 1144). A transparent coat of rigid ink (1125) followed by a laser reactive protective layer (1124) may be disposed on the front face continuous metal layer (1130). A print layer (1126), ink and primer, may be disposed between the transparent coat of rigid ink (1125) and the front face metal layer (1130). A transparent, translucent, white or colored synthetic layer (1160) may be disposed behind the rear discontinuous metal layer (1150). At least one of primer (1162) and ink (1164) may be disposed on the synthetic layer. A laser engravable overlay layer (1170) may be disposed behind the synthetic layer (1160). A dual-interface chip module (1110) may be inserted into the module openings (1112, 1114) of the card body, with its module antenna (MA: 1111) being concentric to the coupler coil (CC: 144C) of the booster antenna circuit (BAC: 1144) and the metal ledge (1116) with metal edge surrounding the module opening (MO: 1114) in the rear discontinuous metal layer (1150). Adhesive layers (1138, 1148 and 1158) are thermosetting epoxy layers with or without a dielectric layer (e.g. PEN). Between the magnetic shielding layer (1142) and the booster antenna circuit (BAC: 1144) there is an adhesive layer (1143). The module opening (1114) in the rear discontinuous metal layer (1150) may be stuffed with a plastic slug (1115) of suitable color to match the graphics on the synthetic layer (1160). The booster antenna circuit (BAC: 1144) is a closed loop circuit with no open-ended antenna elements and having as option an integrated parallel plate capacitor bank for frequency trimming According to some embodiments (examples) of the invention, the card body of a smartcard 1000A may comprise of a booster antenna circuit on a PET carrier layer (1044B) having a top perimeter coil (1044A), a bottom coupler coil (1044C) and a capacitor bank with top and bottom electrodes (1044D, 1044E). The top perimeter coil (1044A) is routed along all four edges of the card body and inductively couples with the metal at the outer edges of the discontinuous metal layer (1050) and its windings overlap the slit (1020A) or slits (1020A and 1020B) in the discontinuous metal layer (1050). The coupler coil (1044C) inductively couples with the module antenna (MA: 1011) of a transponder chip module (TCM) while at the same time overlaps the metal ledge (1016) surrounding the module opening (MO: 1014) in the discontinuous metal layer (1050). The coupler coil (1044C), module antenna (1011) and metal opening (1014) are concentric. The RF performance in terms of contactless transmission and reception is directly related to the proximity of the perimeter coil (1044A) to the outer metal edges of the discontinuous metal layer (1050) preferably less than 500 μm, its overlap with the slit (1020A) or slits (1020A and 1020B); the coverage of the module antenna (1011) relative to the coupler coil (1044C); and the overlap of the coupler coil (1044C) with the metal ledge (1016) that surrounds the module opening (1014) in the discontinuous metal layer (1050).

According to some embodiments (examples) of the invention, the card body of a smartcard 900A may comprise a stack-up of layers, including: a front face continuous metal layer (930) having a first module opening (MO: 912); a magnetic shielding layer (942) disposed behind the front face continuous metal layer; a booster antenna circuit (BAC: 944) disposed behind the magnetic shielding layer; and a rear discontinuous metal layer (950) having a second module opening (914), a metal ledge 916 and a slit (920). The underside of the front face continuous metal layer (930) has a protruding boss (932) which extends through the card assembly to the rear discontinuous metal layer (950). The protruding boss (932) is attached to the rear discontinuous metal layer (950) by means of an insulating adhesive layer (948). Openings are provided in the magnetic shielding layer (942) and the booster antenna circuit (944) to accept the protruding boss (932) from the underside of the front face continuous metal layer (930). The protruding boss (932) enables to add weight to the card body, enhances the metal sound and provides for mechanical robustness. Notably, the front face continuous metal layer (930) and the rear discontinuous metal layer (950) sandwich the assembly of the magnetic shielding layer (942) and booster antenna circuit (944), with the protruding boss (932) passing through a center section in the magnetic shielding layer (942) and booster antenna circuit (944). The booster antenna circuit (BAC: 944) may be arranged on a carrier layer such as a PET substrate with the perimeter coil on one side and the coupler coil on the other side.

An adhesive layer (938) may be disposed between the front face continuous metal layer and the magnetic shielding layer (942). The rear discontinuous metal layer (950) may be disposed behind the booster antenna circuit (944). A protective hard coat layer (924) may be disposed on the front face continuous metal layer. A print layer (926) may be disposed between the protective hard coat layer and the front face metal layer. A transparent, translucent or white synthetic layer (960) may be disposed behind the rear discontinuous metal layer. At least one of primer (962) and ink (964) may be disposed on the synthetic layer. A laser engravable overlay layer (970) may be disposed behind the synthetic layer. A dual-interface chip module (910) may be inserted into the module openings of the card body, with its module antenna 911 being concentric to the coupler coil 944C of the booster antenna circuit 944 and the metal ledge 916 surrounding the module opening in the rear discontinuous metal layer. Adhesive layers 938, 948 and 958 are thermosetting epoxy layers with or without a dielectric layer (e.g. PEN). Between the magnetic shielding layer (942) and the booster antenna circuit (944) there is an adhesive layer (943). The module opening (MO) 914 in the rear discontinuous metal layer (950) is stuffed with a plastic slug (915) to fill the void. The booster antenna circuit (944) is a closed loop circuit with no open-ended antenna elements and having as option an integrated parallel plate capacitor bank for frequency trimming According to some embodiments (examples) of the invention, the card body of a smartcard 800A may comprise a stack-up of layers, including: a front face continuous metal layer (830) having a first module opening (MO: 812); a magnetic shielding layer (842) disposed behind the front face continuous metal layer; a booster antenna circuit (BAC: 844) disposed behind the magnetic shielding layer; and a rear discontinuous metal layer (850) having a second module opening (814) and a slit (820). Notably, the front face continuous metal layer (830) does not have a slit extending from a peripheral edge of the front face metal layer to the first module opening. In addition, the front face continuous metal layer (830) and the rear discontinuous metal layer (850) sandwich the assembly of the magnetic shielding layer (842) and booster antenna circuit (844). The booster antenna circuit (BAC: 844) may be arranged on a carrier layer such as a PET substrate with the perimeter coil on one side and the coupler coil on the other side.

An adhesive layer (838) may be disposed between the front face continuous metal layer and the magnetic shielding layer. The rear discontinuous metal layer (850) may be disposed behind the booster antenna circuit (844). A protective hard coat layer (824) may be disposed on the front face continuous metal layer. A print layer (826) may be disposed between the protective hard coat layer and the front face metal layer. A transparent, translucent or white synthetic layer (860) may be disposed behind the rear discontinuous metal layer. At least one of primer (862) and ink (864) may be disposed on the synthetic layer. A laser engravable overlay layer (870) may be disposed behind the synthetic layer. A dual-interface chip module (810) may be inserted into the module openings of the card body, with its module antenna being concentric to the coupler coil of the booster antenna circuit and the metal ledge surrounding the module opening in the rear discontinuous metal layer. Adhesive layers 838, 848 and 858 are thermosetting epoxy layers with or without a dielectric layer (e.g. PEN). Between the magnetic shielding layer 842 and the booster antenna circuit (844) there is an adhesive layer (843). The module opening (814) in the rear discontinuous metal layer (850) may be stuffed with a plastic slug (815) of suitable color to match the graphics on the synthetic layer (860). The booster antenna circuit (BAC) 844 is a closed loop circuit with no open-ended antenna elements and having as option an integrated parallel plate capacitor bank for frequency trimming.

According to some embodiments (examples) of the invention, the card body of a smartcard may comprise a stack-up of layers, including: a front metal layer (730) having a first module opening (MO: 712); a shielding layer (742) disposed behind the front metal layer; a booster antenna circuit (BAC: 744) disposed behind the shielding layer; and a metal interlayer or layers (750) each having a second module opening (714) and a slit (720). Notably, the front metal layer does not have a slit extending from a peripheral edge of the front metal layer to the first module opening. A dielectric spacer (738) may be disposed between the front metal layer and the shielding layer. The metal interlayer or layers may be disposed behind the booster antenna circuit. Alternatively, the metal interlayer or layers may be disposed between the front metal layer and the booster antenna circuit. A protective hard coat layer (724) may be disposed on the front metal layer. A print layer (726) may be disposed between the hard coat layer and the front metal layer. A transparent, translucent or white synthetic layer (760) may be disposed behind the metal interlayer or layers. At least one of primer (762) and ink (764) may be disposed on the synthetic layer. A laser engravable overlay layer (770) may be disposed behind the synthetic layer. A dual-interface module (710) may be inserted into the module openings of the card body. Adhesive layers 738, 748 and 758 are thermosetting epoxy layers with or without a dielectric layer (e.g. PEN). Between the shielding layer 742 and the booster antenna layer there is an adhesive layer.

According to some embodiments (examples) of the invention, a card body for a smartcard may comprise: a front metal layer (630) having a module opening (MO: 612); a shielding layer (640) disposed behind the front metal layer; and a coupling frame (CF: 650) disposed behind the shielding layer; wherein the front metal layer does not have a slit extending from a peripheral edge of the front metal layer to the module opening. A dielectric spacer (638) may be disposed between the front metal layer and the shielding layer. A protective hard coat layer (624) may be disposed on the front metal layer. A print layer (626) may be disposed between the hard coat layer and the front metal layer. A transparent, translucent or white synthetic layer (660) may be disposed behind the metal interlayer or layers. At least one of primer (662) and ink (664) may be disposed on the synthetic layer. A laser engravable overlay layer (670) may be disposed behind the synthetic layer. A dual-interface module (610) may be inserted into the module openings of the card body. Adhesive layers 638, 648 and 658 are thermosetting epoxy layers with or without a dielectric layer (e.g. PEN).

The invention may relate to innovations in or improvements to RFID-enabled ("contactless capable) metal smartcards or metal transaction cards having two metal layers (with only one of the metal layers modified to function as a coupling frame), and using an appropriate adhesive medium disposed between the two metal layers which sandwich a magnetic shielding layer and a booster antenna circuit.

The card body (CB) may have two metal layers of different materials, adhesively joined to each other using a thermosetting epoxy that converts from B-stage to C-stage during lamination.

The adhesive system may be a modified epoxy polyester adhesive with a melt point of approx. 105±1° C. (220±30° F.), matching the unique properties of the synthetic layers. Alternatively, an epoxy-resin adhesive system may be selected with an operating temperature of 150-170° C. for prelamination of the metal layers (pressure of ≥50 N/cm$^2$/ ≥73 psi for 40 min.), prior to laminating to the synthetic layers.

Different metal layers may be used in a card construction having two metal layers, such as titanium and stainless steel. Other metals, such as brass may also be chosen.

According to some embodiments (examples) of the invention, a smartcard (SC) may comprise two metal layers adhesively attached to each other with thermosetting epoxy. The thermosetting epoxy may be applied in B-stage, and converts to C-stage after a lamination process involving temperature and pressure. The two metal layers may be separated by a dielectric carrier layer.

The dielectric carrier layer may comprise a PET film, or a PEN film. The thermosetting epoxy may be applied to both (front and rear) sides of the dielectric carrier. At least one of the metal layers may have a slit (S) so that it may function as a coupling frame (CF).

It is an object of the invention, in producing metal containing dual interface smartcards to laminate metal-to-metal and metal-to-plastic under temperature and pressure using an adhesive system that does not reactivate in a later process step when temperature is applied to the laminated structure. In CNC machining the laminated structure to extract individual card bodies, also referred to as singulation, it is imperative that the thermal influence from milling does not cause the adhesive to melt at the edges of the cut. If the adhesive is soft and tacky it will impair the cutting process and reduce the lifetime of the milling tools.

It is an object of the invention that the adhesive system is delivered as a partially cured epoxy or B-staged epoxy adhesive that converts to the C-stage during the lamination process by applying temperature and pressure. This C-stage state should be the final reaction stage of the thermosetting resin where the epoxy is mostly insoluble and infusible.

The dielectric layer may be constructed from a 25 μm Polyethylene Naphthalate (PEN) film coated on both sides with a 25 μm coating of an epoxy based thermosetting adhesive system. Different metal layers with different acoustic properties may be used in the card construction, such as the combination of titanium and stainless steel.

According to an embodiment of the invention a metal transaction card with a front face continuous or discontinuous metal layer may have graphics applied to its surface by digitally depositing a primer and ink (clear, white, and or color ink: 826, 926) and curing with UV light. The inkjet printed ink (CMYK) is flexible or stretchable. The flexible ink layer representing the artwork is further protected by a digitally printed hard or rigid ink layer (825, 925) which is transparent. To further scratch protect the underlying graphics a gloss or matt coating (824, 924) is applied by means of silk screen printing or roller coating. The coating is a laser reactive layer (824, 924) which can be laser marked (working in the infrared range of ~1064 nm) with personalization data (876, 976).

In their various embodiments, the invention(s) described herein may relate to industrial and commercial industries, such RFID applications, payment transaction cards (metal, ceramic, plastic or a combination thereof), electronic credentials, identity cards, loyalty cards, access control cards, and the like.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGs). The figures may generally be in the form of diagrams. Some elements in the figures may be stylized, simplified or exaggerated, others may be omitted, for illustrative clarity.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Some elements may be referred to with letters ("AS", "CBR", "CF", "MA", "MT", "TCM", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and may collectively (all of them at once) referred to simply by the numeral ("310").

Figure 1A:
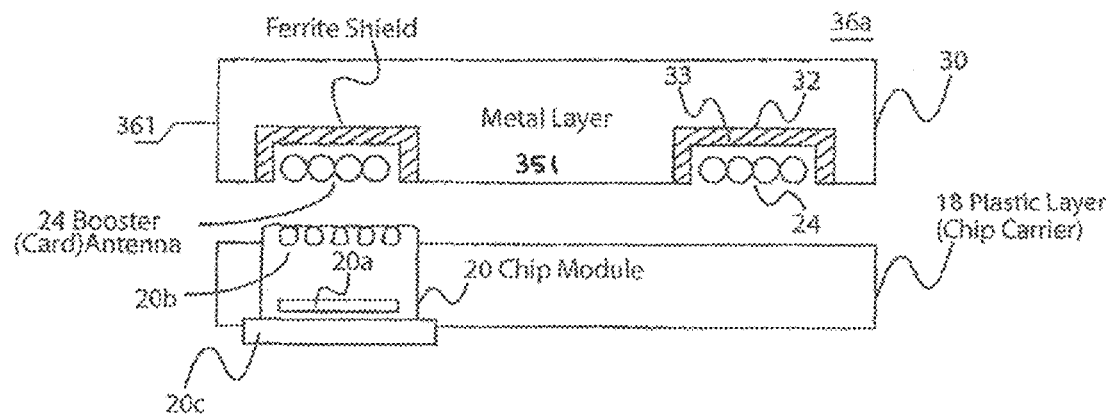

FIG. 1A (compare FIG. 1A of U.S. Ser. No. 17/092,332; FIG. 3A of U.S. Pat. No. 10,275,703) is a cross-sectional diagram of a smart metal card with ferrite shield formed between the card and chip antennas and the cards' metal layer, according to the prior art.

Figure 1B:
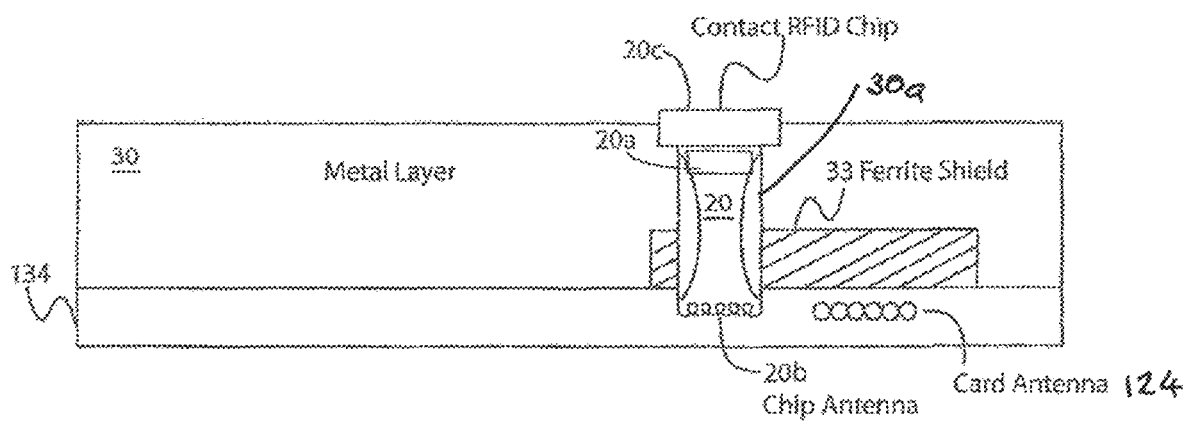

FIG. 1B (compare FIG. 1B of U.S. Ser. No. 17/092,332; FIG. 6B of U.S. Pat. No. 10,275,703) is a simplified partial cross-sectional view of a dual interface smart card, according to the prior art.

Figure 1C:
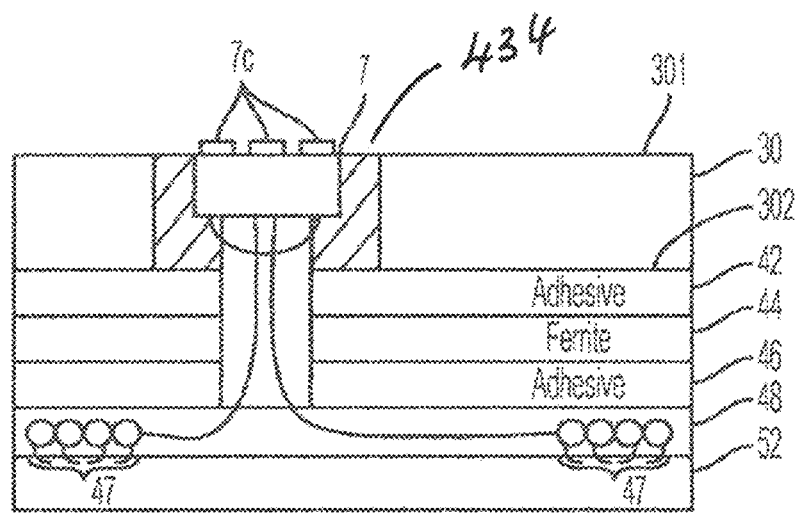
Figure 4:
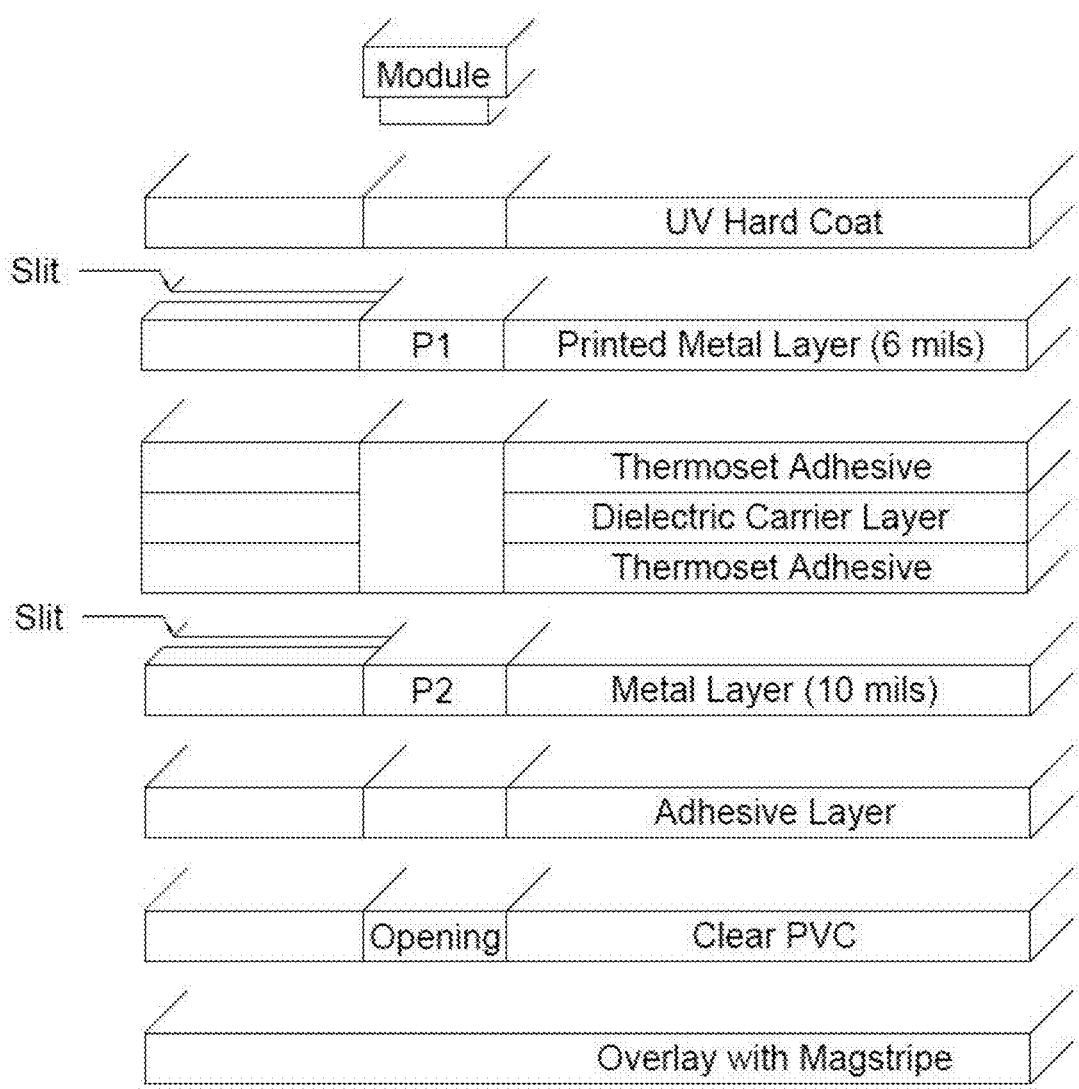

FIG. 1C (compare FIG. 1C of U.S. Ser. No. 17/092,332; FIG. 4 of U.S. Pat. No. 10,318,859) is a cross-sectional diagram of the layers of a metal-containing card body with booster antenna and shielding layer, according to the prior art.

Figure 2:
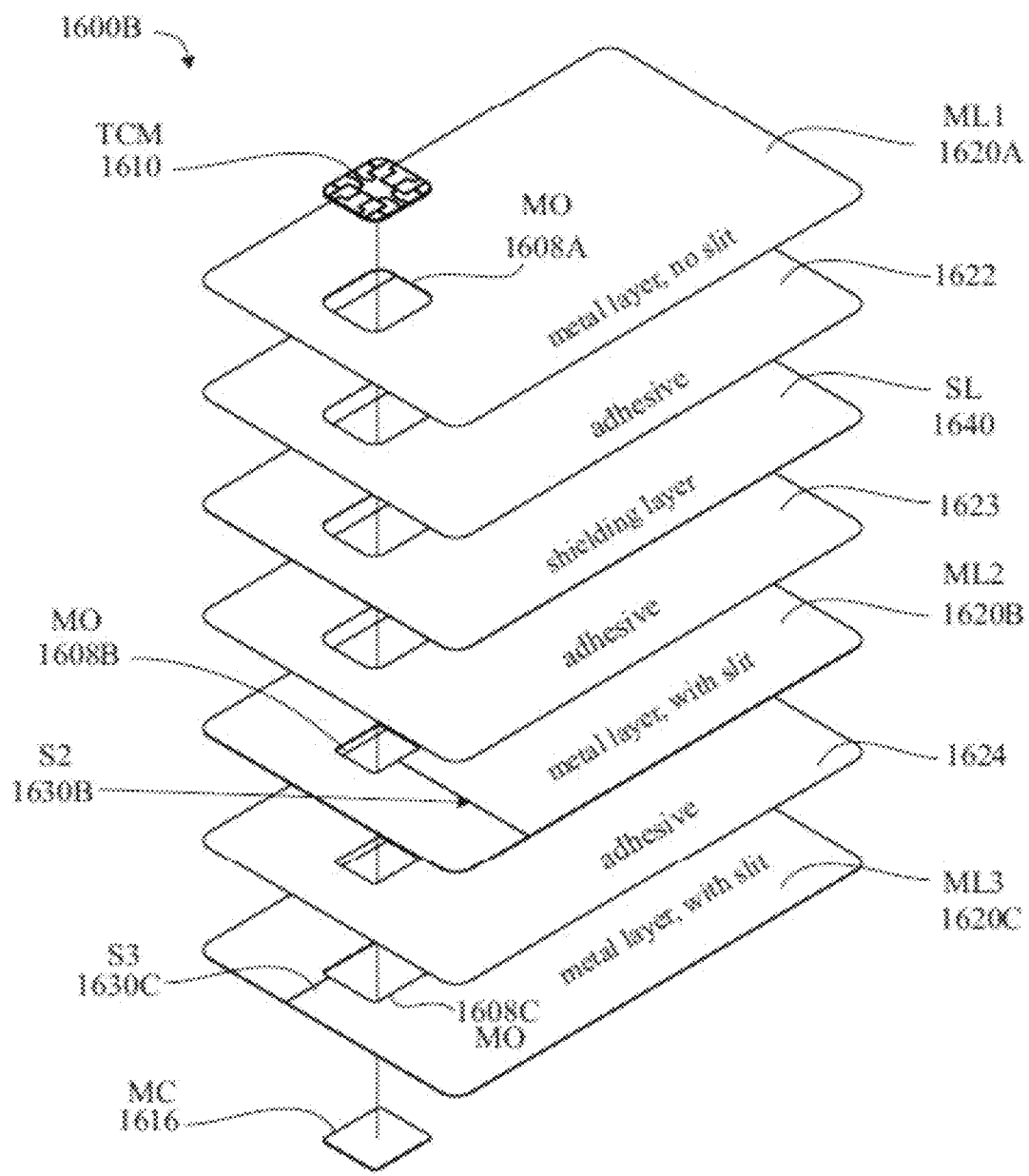

FIG. 2 (compare FIG. 2 of U.S. Ser. No. 17/092,332; FIG. 16B of U.S. Pat. No. 9,836,684) is a diagram (exploded perspective view) of a shielded metal laminated smartcard (RFID device), according to the prior art.

Figure 3:
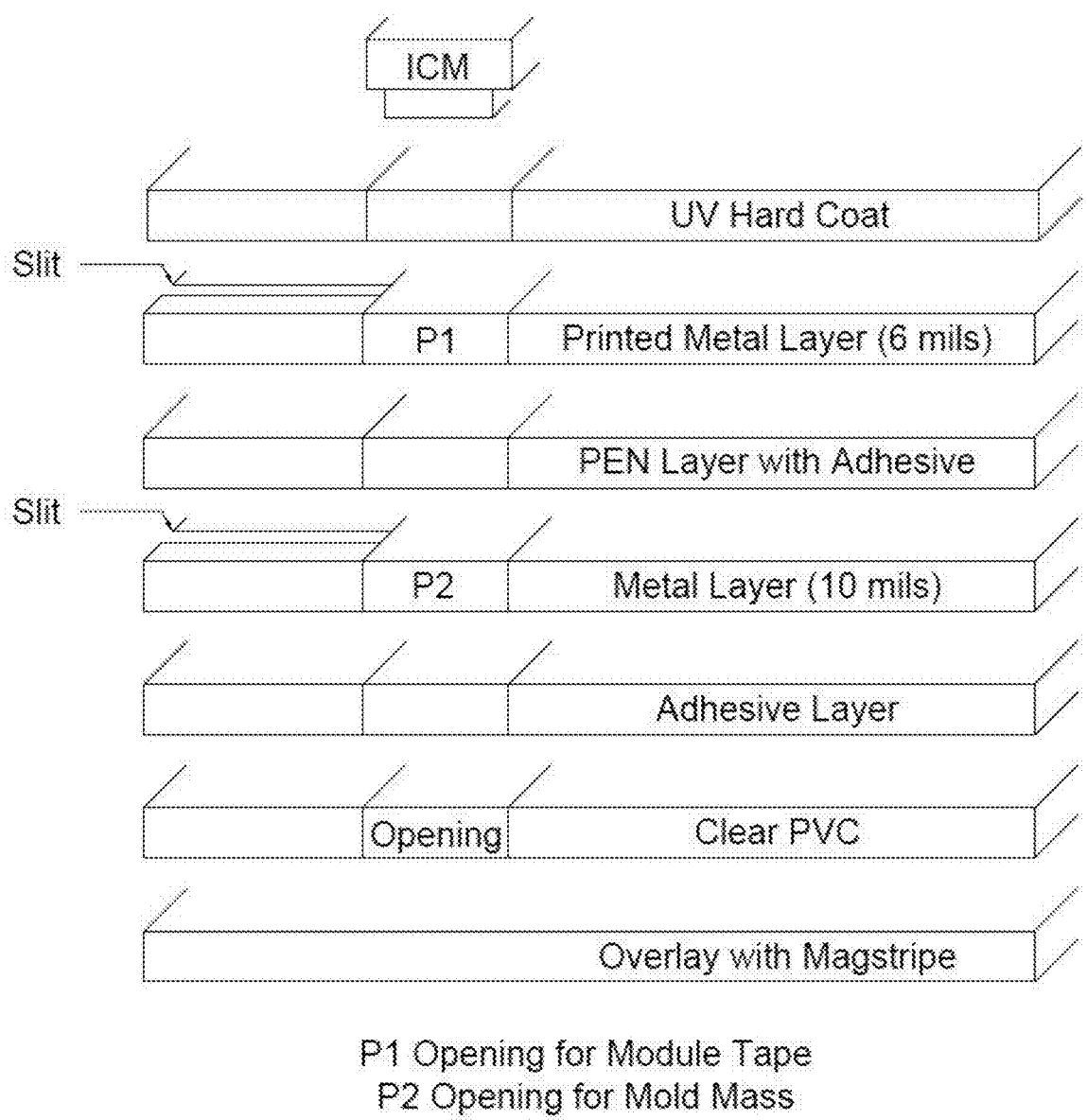

FIG. 3 (FIG. 14 of U.S. Ser. No. 16/993,295—now US 2021/0049431) is a diagram, in cross-section (exploded, and partially perspective), of a "Metal Face" transaction card showing a stacking of layers for a transaction card construction. An inductive coupling chip module (ICM) for inserting in openings (module opening) in the layers of the transaction card is shown, according to the invention.

FIG. 4 (FIG. 16 of U.S. Ser. No. 16/993,295—now US 2021/0049431) is a diagram, in cross-section (exploded, and partially perspective), of a "Metal Face" transaction card showing a stacking of layers for a transaction card construction. The two metal layers are separated by a double-sided adhesively coated dielectric carrier layer. An inductive coupling chip module for inserting in openings (module opening) in the layers of the transaction card is shown, according to the invention.

Figure 5:
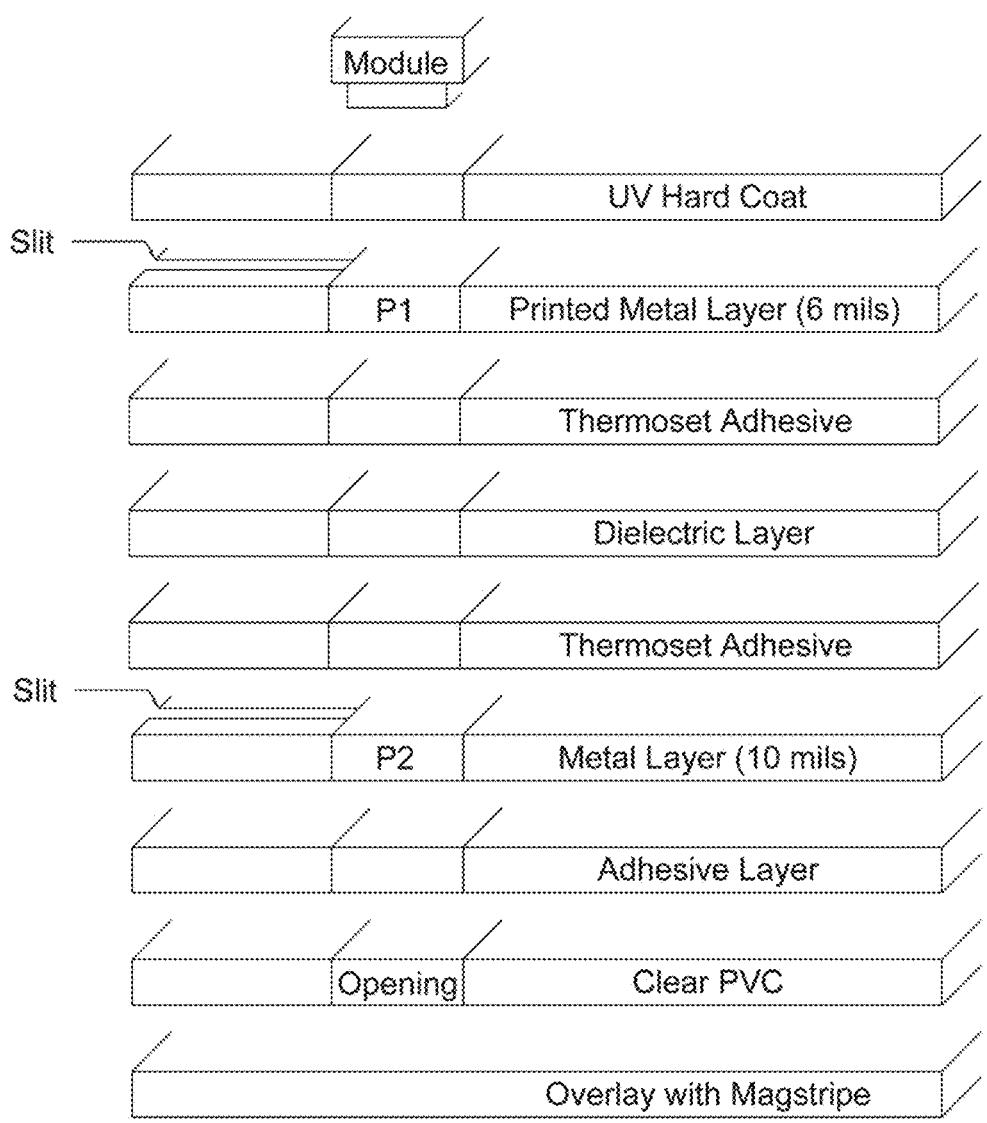

FIG. 5 (FIG. 17 of U.S. Ser. No. 16/993,295—now US 2021/0049431) is a diagram, in cross-section (exploded, and partially perspective), of a "Metal Face" transaction card showing a stacking of layers for a transaction card construction. The two metal layers are separated by three layers, comprising a first thermosetting adhesive layer, a dielectric layer, and a second thermosetting adhesive layer. An inductive coupling chip module for inserting in openings (module opening) in the layers of the transaction card is shown, according to the invention.

Figure 6A:
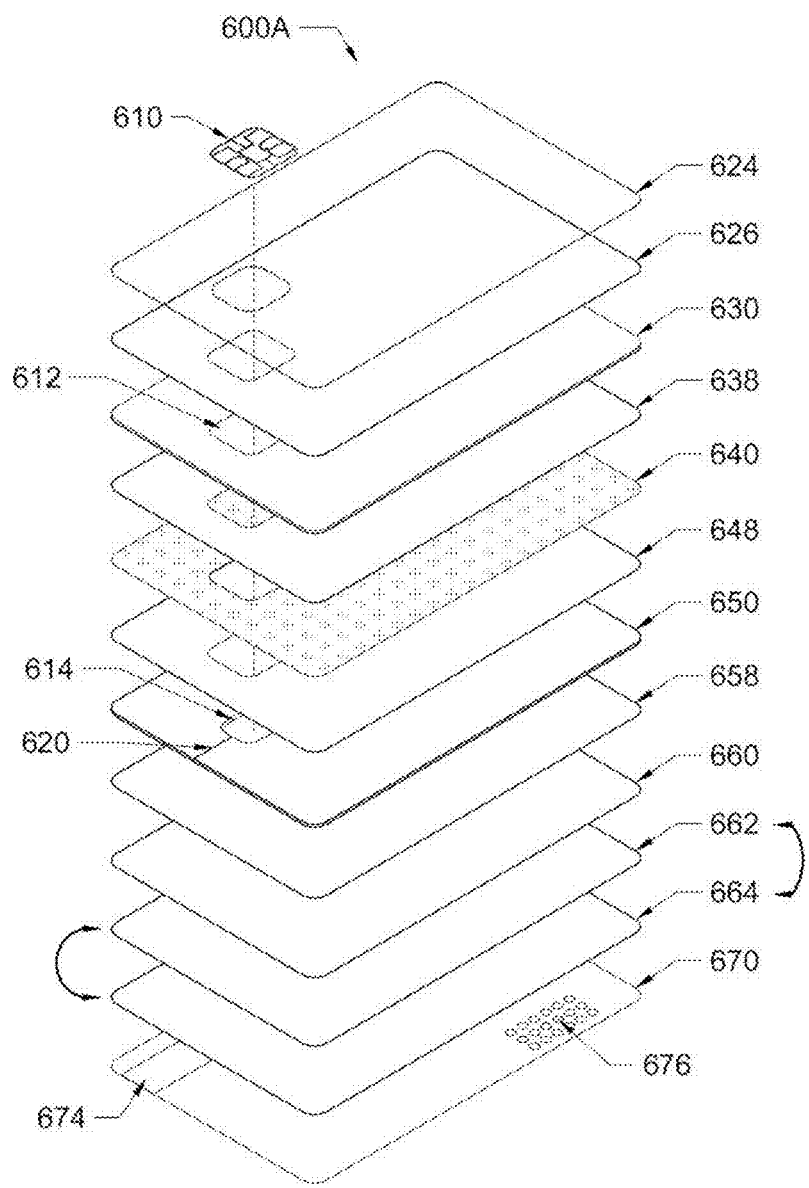
Figure 6B:
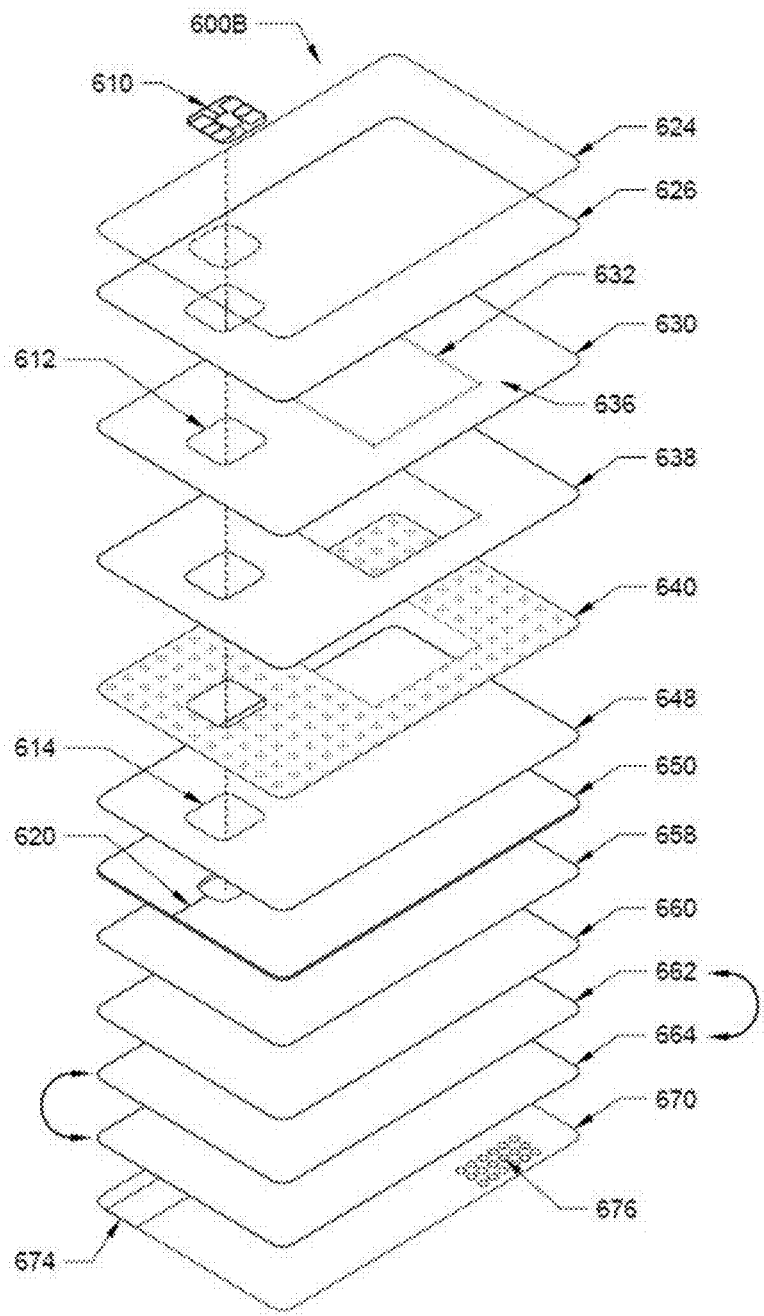

FIG. 6A (FIG. 6A of U.S. Ser. No. 17/092,332) is a diagram (exploded perspective view) of the stack-up construction of a dual interface metal face smartcard with contactless tap to pay function on one side of the card body having a metal interlayer with slit to function as a coupling frame (CF), according to an embodiment of the invention.

FIG. 6B (FIG. 6B of U.S. Ser. No. 17/092,332) is a modified diagram of FIG. 6A showing a stack-up construction of a dual interface metal face smartcard with contactless tap to pay function on one side of the card body, having a front face solid metal layer without a discontinuity with its rear surface having an off-center protruding metal section, according to an embodiment of the invention.

Figure 6C:
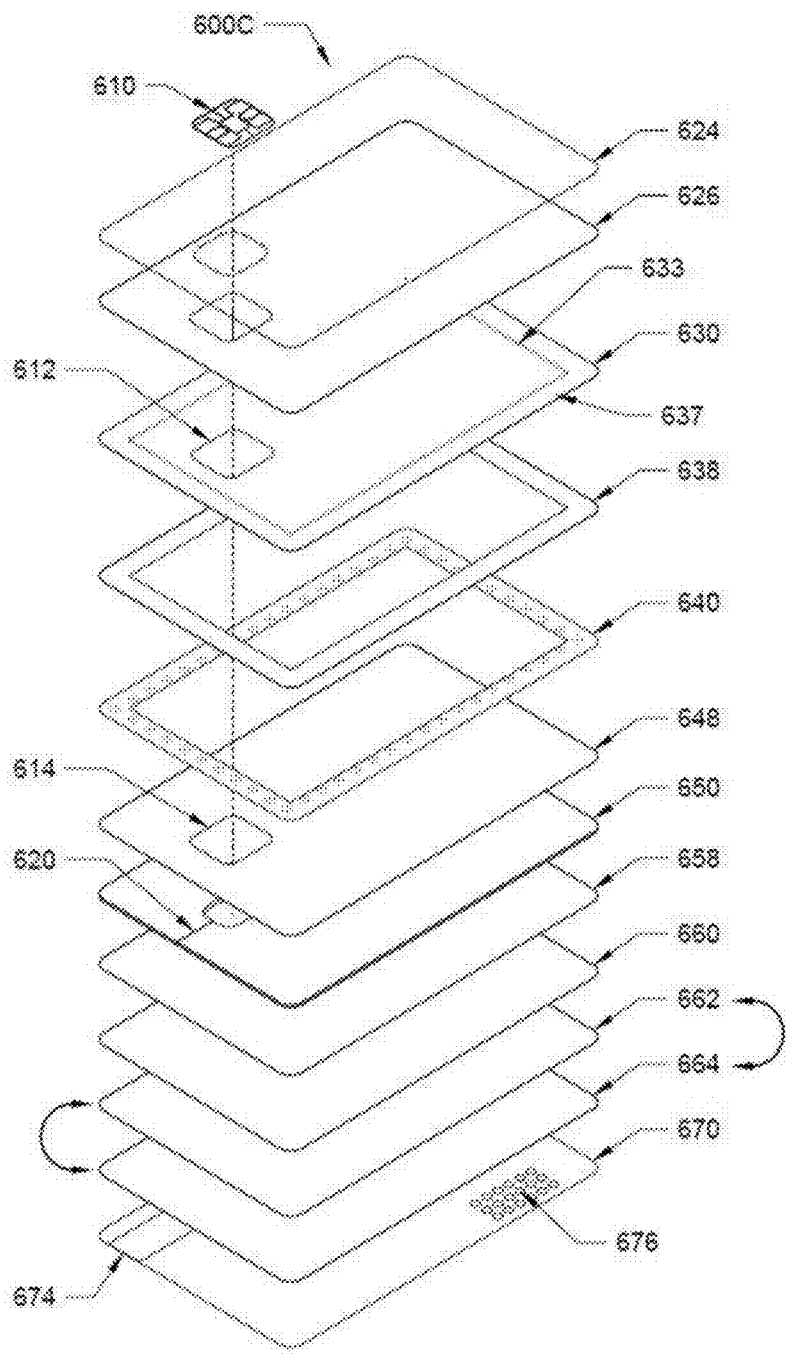

FIG. 6C (FIG. 6C of U.S. Ser. No. 17/092,332) is a modified diagram of FIG. 6B showing the stack-up construction of a dual interface metal face smartcard with contactless tap to pay function on one side of the card body, having a front face solid metal layer without a discontinuity attached to an underlying frame of anti-shielding material, according to an embodiment of the invention.

Figure 7:
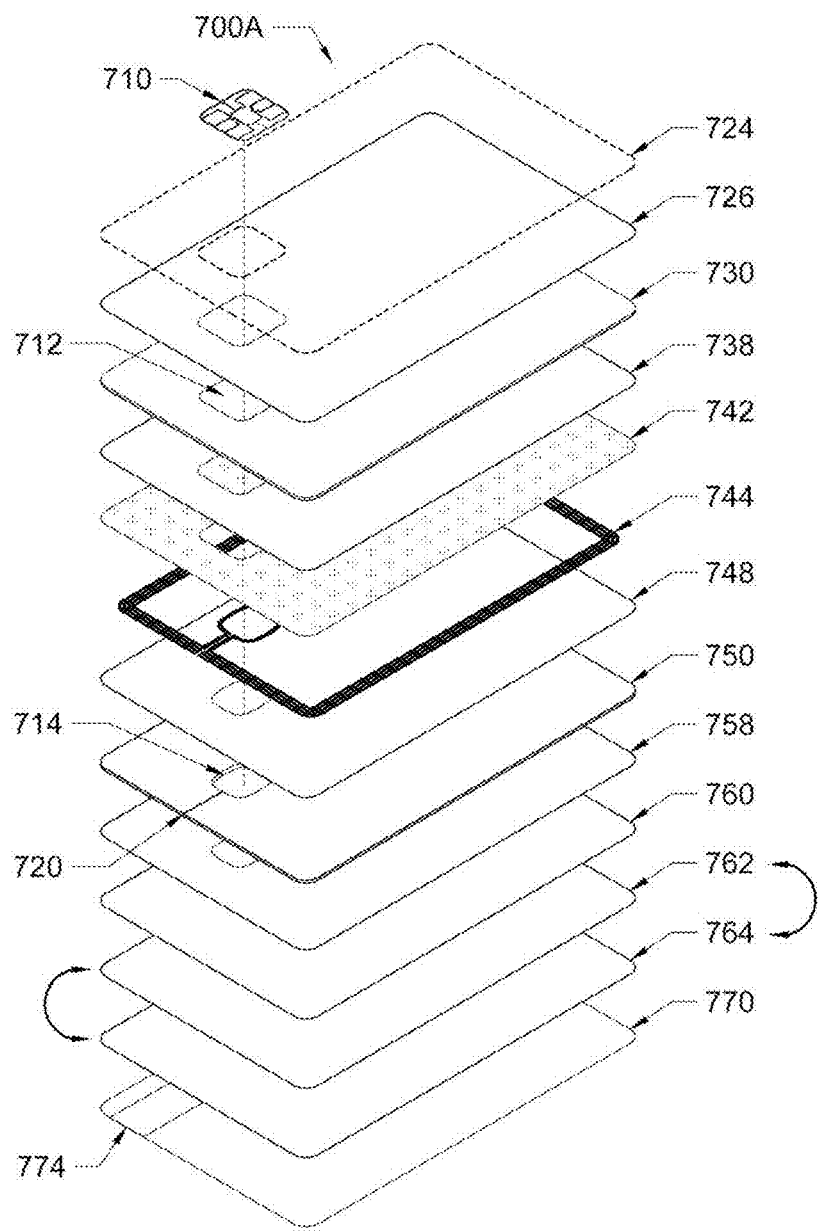

FIG. 7 (FIG. 7A of U.S. Ser. No. 17/092,332) is a diagram (exploded perspective view) of the stack-up construction of a dual interface metal face smartcard with contactless tap to pay function on one side of the card body having a booster antenna circuit (BAC) in combination with an underlying metal interlayer having a slit to function as a coupling frame or coupling frame antenna, according to an embodiment of the invention.

Figure 8A:
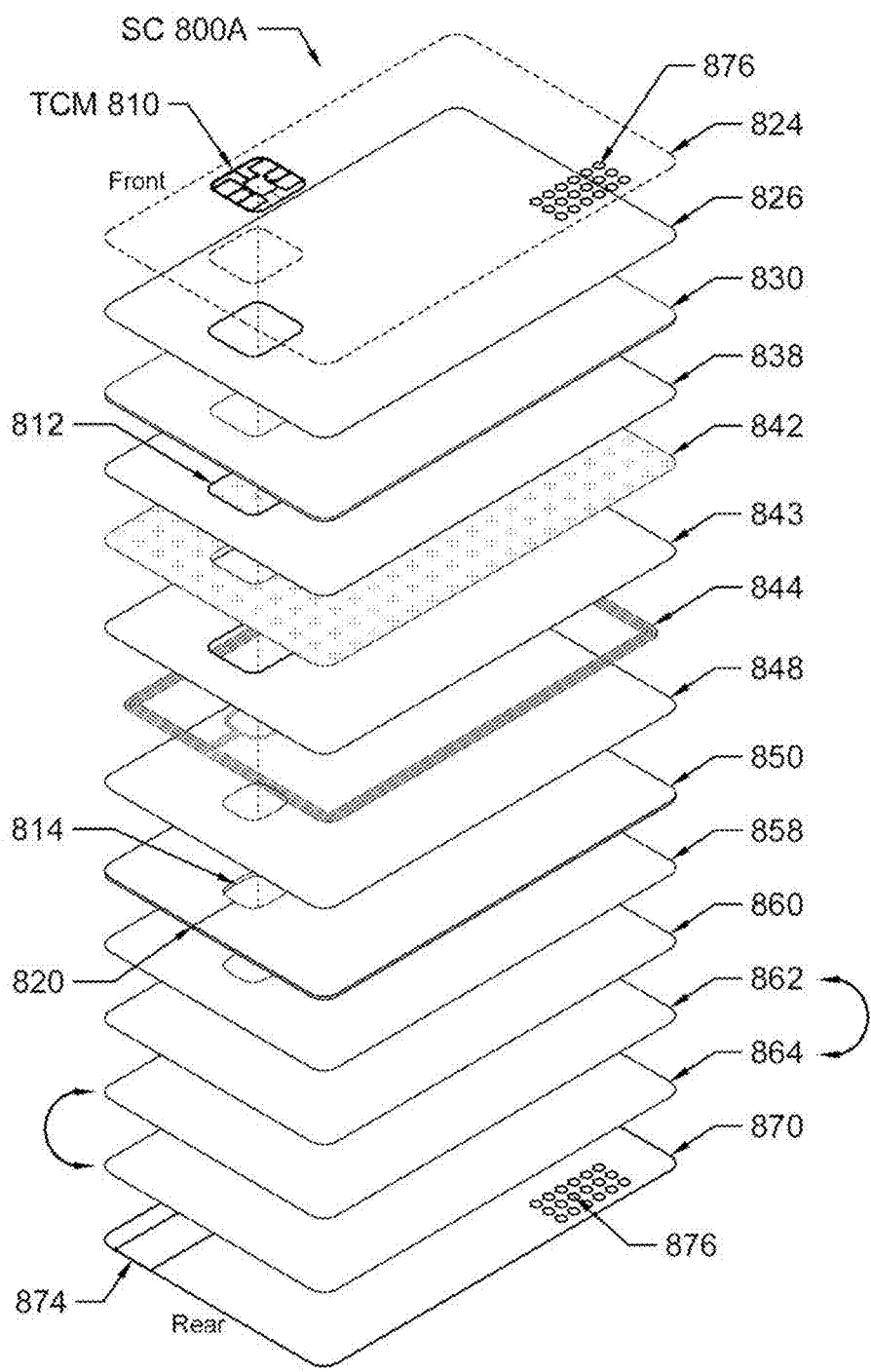

FIG. 8A is a diagram (exploded perspective view) of the stack-up construction of a dual interface metal face smartcard with contactless tap to pay function operating from the rear side of the card body with two metal layers, one continuous and the other discontinuous, sandwiching a booster antenna circuit (BAC) mounted to a magnetic shielding layer, with the booster antenna circuit (BAC) adhesively attached to the rear discontinuous metal layer and the magnetic shielding layer adhesively attached to the front continuous metal layer, according to an embodiment of the invention.

Figure 8B:
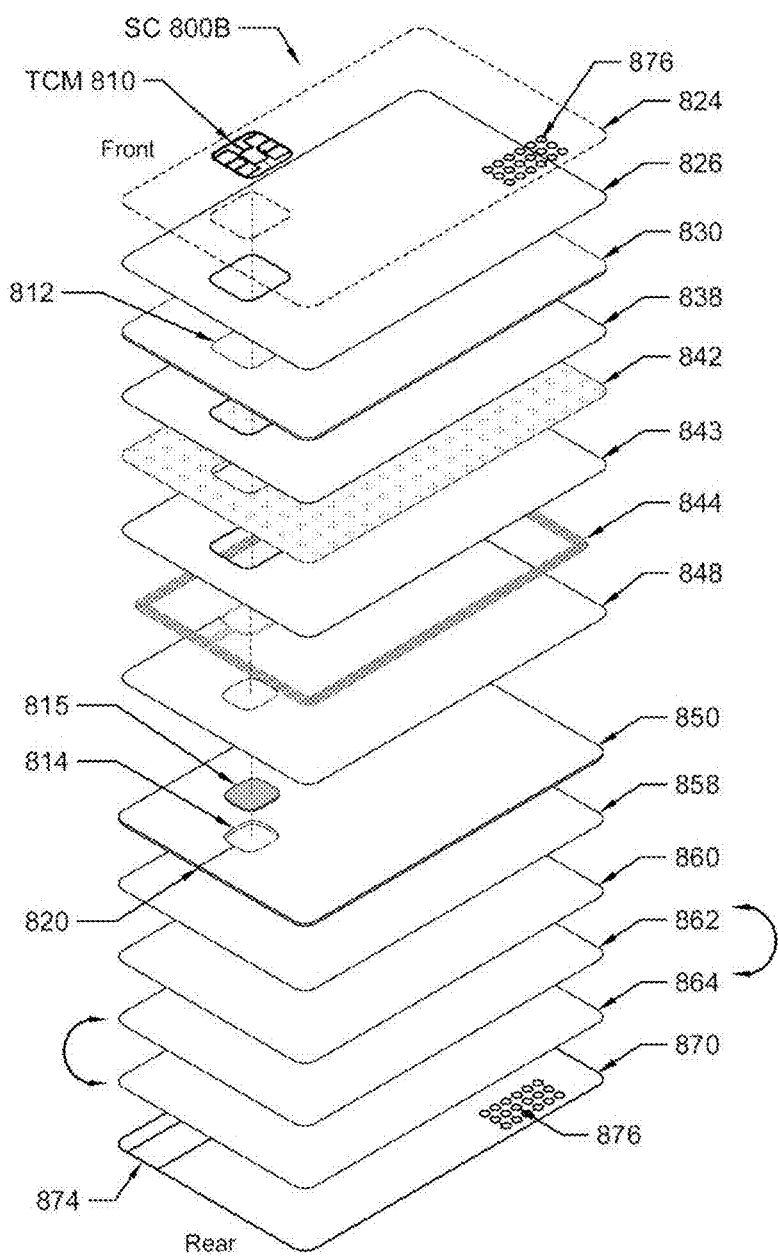

FIG. 8B is a modified diagram of FIG. 8A showing the stack-up construction of a dual interface metal face smartcard with contactless tap to pay function from the rear side of the card body, having a plastic slug inserted into the laser cut module opening in the rear metal interlayer, thus filling the void before lamination of the adhesive layer and synthetic layers to the remaining card body assembly, according to an embodiment of the invention.

Figure 8C:
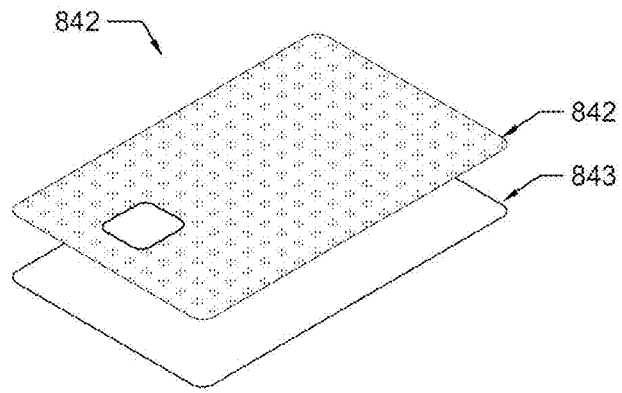

FIG. 8C is an exploded view of the magnetic shielding layer with an adhesive layer for attachment to the booster antenna circuit.

Figure 8D:
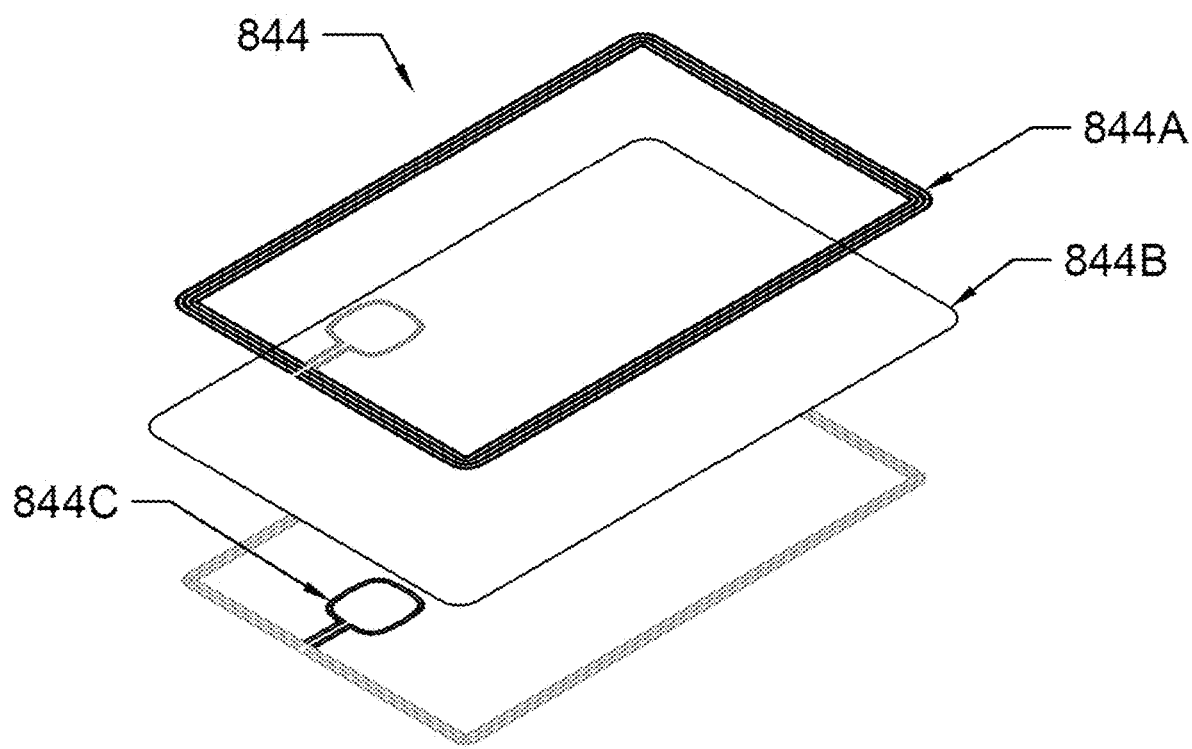

FIG. 8D is an exploded view of the booster antenna circuit with its antenna elements, capacitor bank, jumpers and vertical interconnects on both sides on a carrier layer, according to an embodiment of the invention.

Figure 9A:
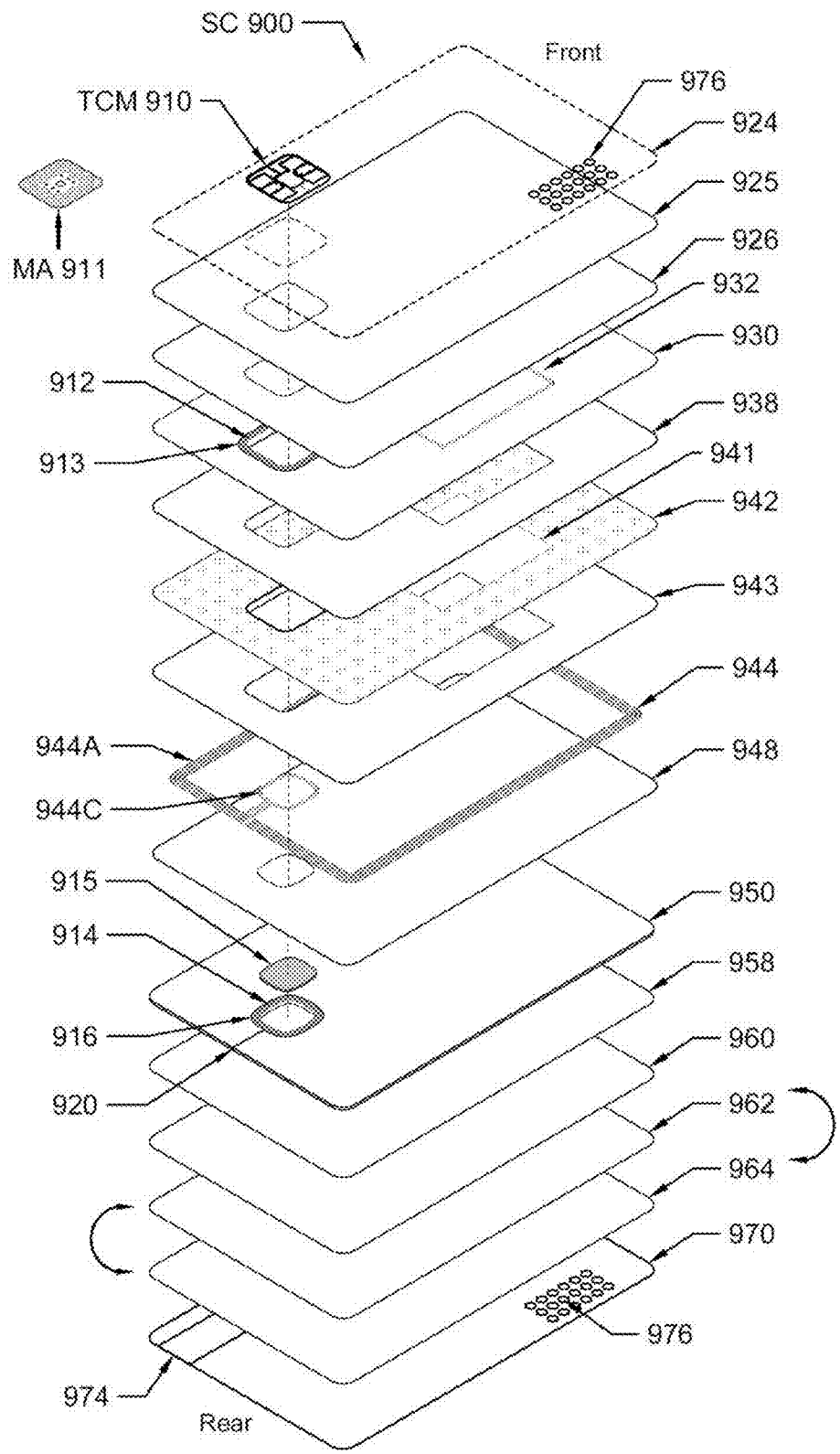

FIG. 9A is a diagram (exploded perspective view) of the stack-up construction of a dual interface metal face smartcard with contactless tap to pay function from the rear side of the card body, having a booster antenna circuit mounted on a magnetic shielding layer with both components sandwiched between a front face solid metal layer and a rear metal interlayer with a module opening and slit. The underside of the front face metal layer has a protruding boss which extends through the card assembly to the rear metal interlayer. The module opening of the rear metal interlayer is stuffed with a plastic slug to fill the void, according to an embodiment of the invention.

Figure 9B:
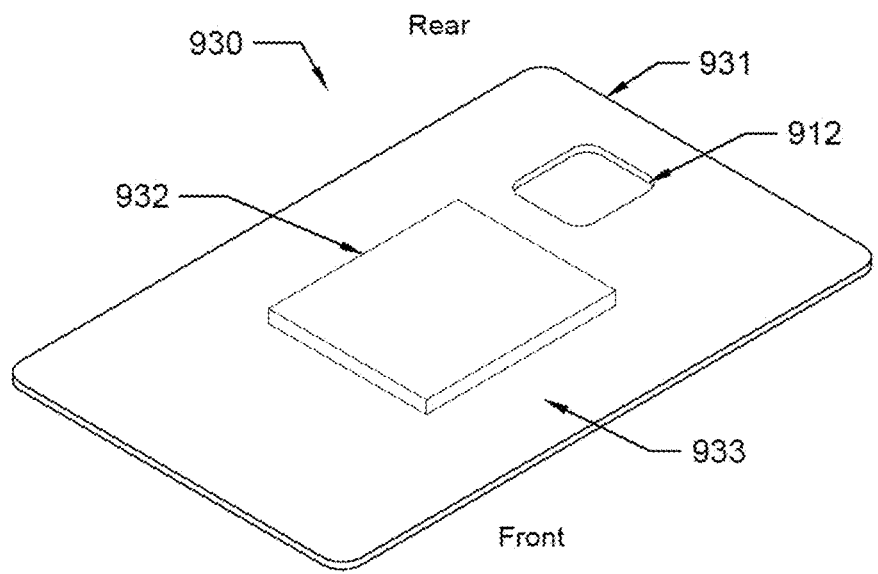

FIG. 9B is a diagram (exploded perspective view) of the underside of the front face metal layer with a protruding boss and a slightly raised metal ledge running along the outer edge of the metal layer, and showing an opening to accept the implanting of a transponder chip module, according to an embodiment of the invention.

Figure 9C:
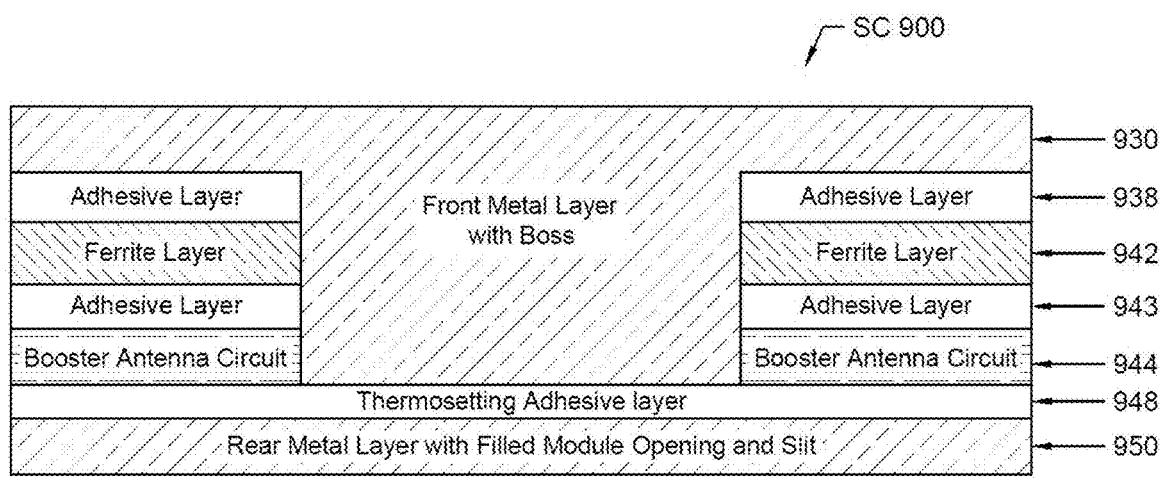

FIG. 9C is a cross sectional diagram of a smartcard having a front face metal layer (continuous) and a rear metal interlayer (discontinuous), sandwiching a magnetic shielding layer adhesively attached to a boater antenna circuit, with the front face metal layer having a protruding boss which passes through cut-outs in the adhesive layers, magnetic shielding layer and the booster antenna circuit, according to an embodiment of the invention.

Figure 10A:
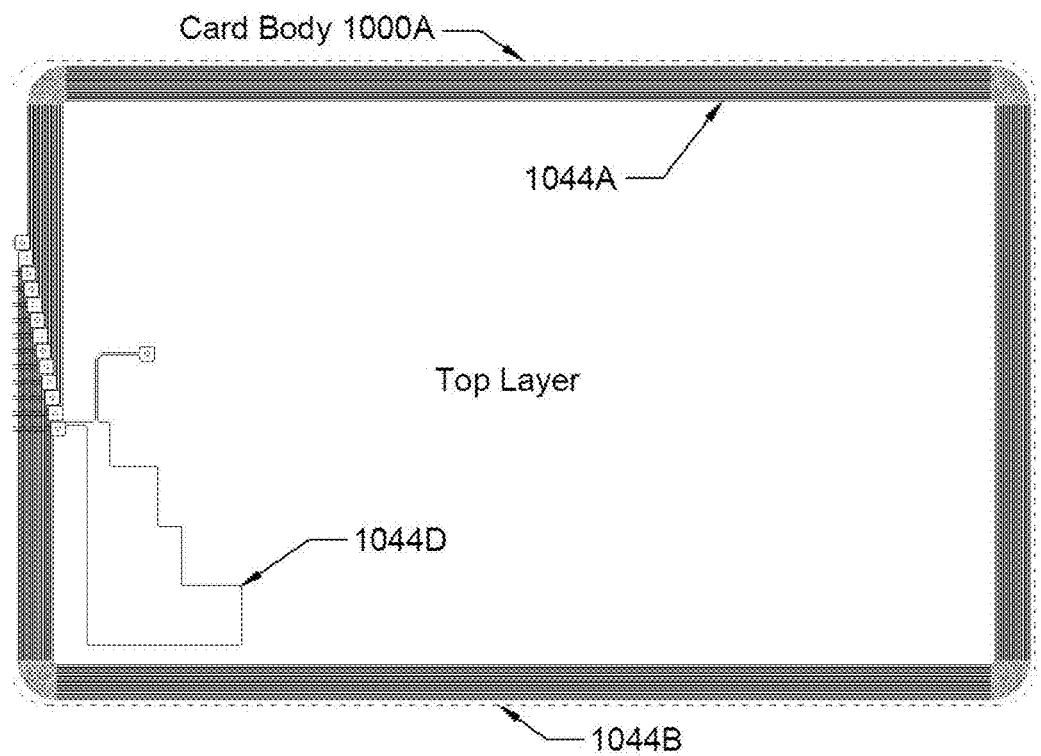

FIG. 10A is a diagram showing a top layer of a plated copper antenna circuit for coupling with the perimeter metal edges of a discontinuous metal layer, according to an embodiment of the invention.

Figure 10B:
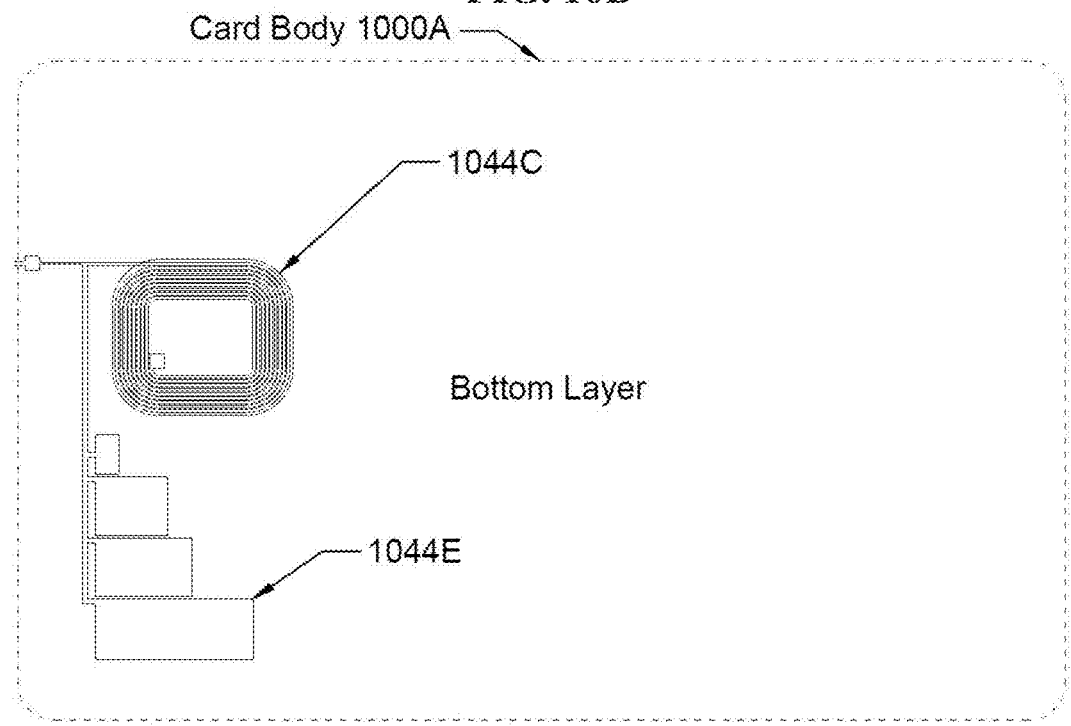

FIG. 10B is a diagram showing a bottom layer of a plated copper antenna circuit for coupling simultaneously with a module antenna of a transponder chip module and a metal ledge of a module opening in a discontinuous metal layer, according to an embodiment of the invention.

Figure 10C:
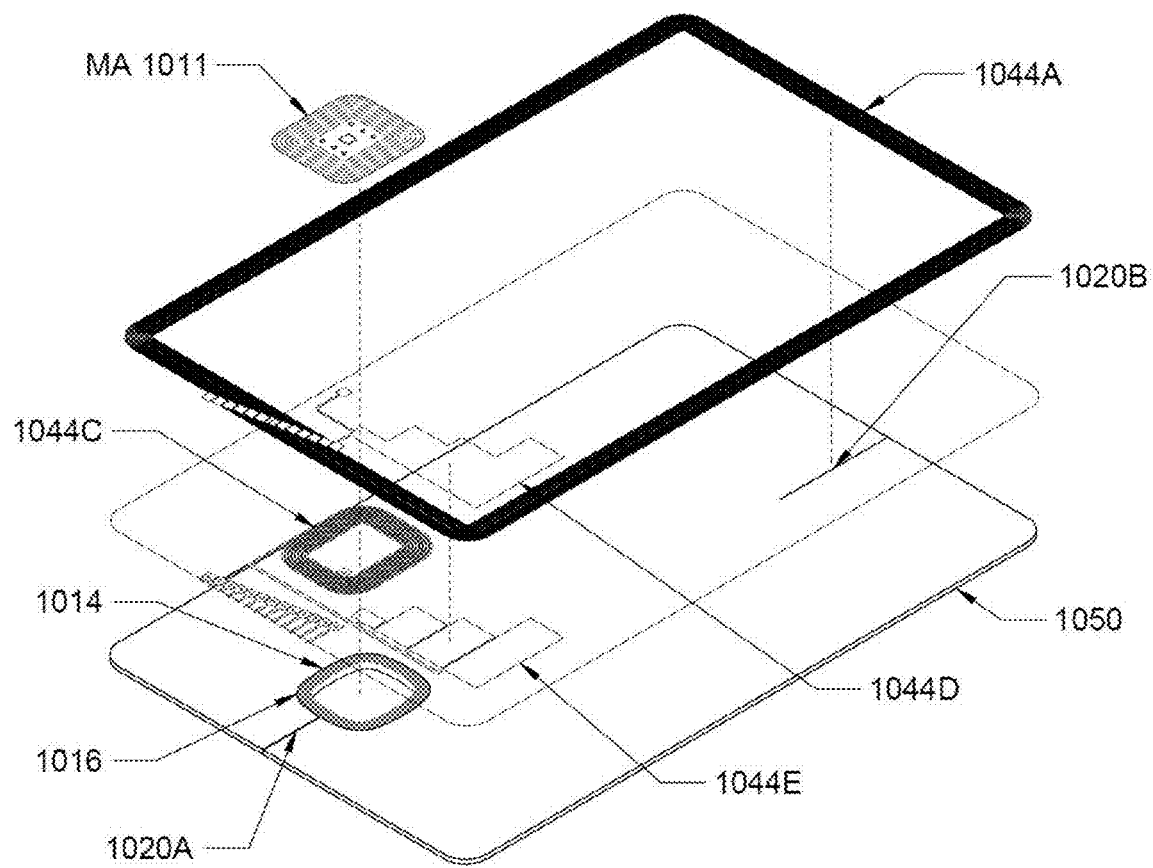

FIG. 10C is an exploded view of booster antenna circuit assembled to a discontinuous metal layer forming the rear side of a smartcard, according to an embodiment of the invention.

Figure 11A:
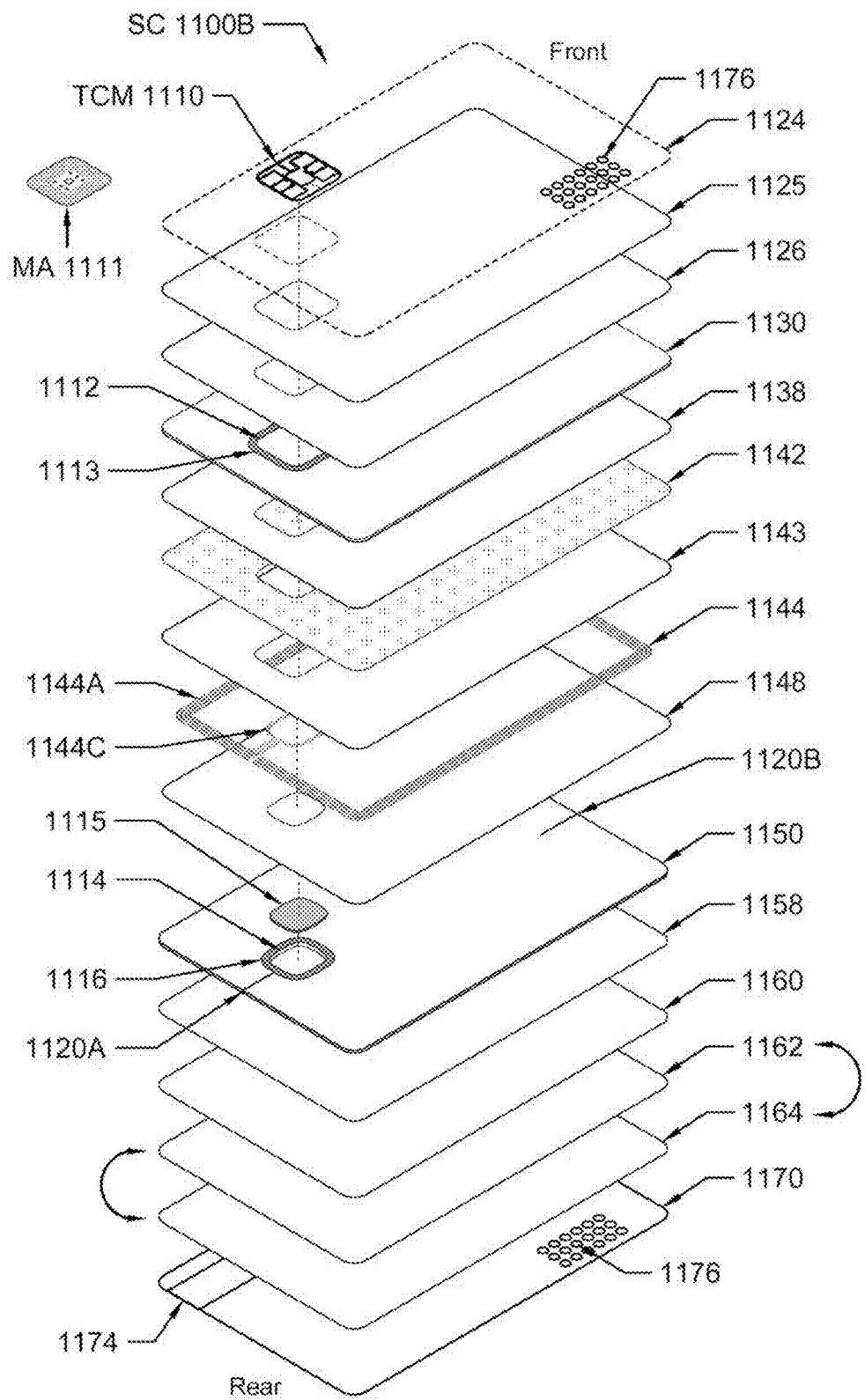

FIG. 11A is a diagram (exploded perspective view) of the stack-up construction of a dual interface metal face smartcard with contactless tap to pay function operating from the rear side of the card body with two metal layers, one continuous and the other discontinuous, sandwiching electronic component elements such as a booster antenna circuit (BAC) mounted to a magnetic shielding layer, with the booster antenna circuit (BAC) adhesively attached to the rear discontinuous metal layer with multiple slits and the magnetic shielding layer adhesively attached to the front continuous metal layer, according to an embodiment of the invention.

DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

Dual Interface Metal Cards with a Ferrite Layer

FIG. 1A includes a sectional view of metal substrate 30 having an exterior (outer) surface 361 and an inner surface 351. After groove 32 is formed on the inner surface 351, ferrite material 33 and an adhesive such as epoxy, cyanoacrylate, silicone based system or thermoplastic adhesive are applied into the channel defined by the groove 32. The ferrite 33 may be applied as a die cut sheet or as a ferrite slurry acrylic oligomer intermediate which will harden under UV exposure or after the slurry solvent is driven off. It should be noted that the ferrite 33 is preferably applied so as to be below the inner surface of the substrate 30 and to rise up to the surface of the card at the edges of groove 32. Note the antenna wires cannot be completely encased or completely shielded by the ferrite layer. That is the ferrite shield cannot completely surround the antenna.

The ferrite shield 33 overlies card (booster) antenna 24. A plastic layer 18 is formed below subassembly 36a. Layer 18 contains and includes a module 20, which contains a microprocessor chip 20a and a chip antenna 20b coupled to chip 20a.

Note that contact pad 20c is on the opposite side of the metal substrate.

In operation, ferrite material 33 deposited in groove 32 shields antenna 24 (and chip antenna 20b) from metal substrate 30, to make it possible for RF radiation to enter and be emitted from antenna 24.

A metal surface interferes with RF radiation in that it absorbs incident RF signals with the metal acting as a virtual ground. The ferrite layer formed between the card antenna 24 (including chip antenna 20b) and the metal layer 30 reflects incident RF signals so they are not absorbed by the metal layer.

Note that a reader (not shown) would be positioned to interrogate the smart card from the non-metallic side of the card for contactless operation.

As set forth in some claims of U.S. Pat. No. 10,275,703:
1. A metal smart card comprising: a plastic layer having a top surface; a metal layer overlying the plastic layer, said metal layer having an inner surface; a groove formed within the inner surface of said metal layer; a card antenna comprising antenna windings disposed within said groove and wound along the top surface of or within said plastic layer; and a strip of RF shielding material lining said groove and disposed between the inner surface of the metal layer and the antenna windings, said strip of RF shielding material overlying the antenna windings and limited to a length and a width sufficient to track the underlying antenna windings to form an RF shield between the antenna windings and the metal layer.
2. The metal smart card of claim 1, wherein the antenna windings are wound adjacent to an outer periphery of the plastic layer.

In FIG. 1A, the subassembly 36a includes a metal substrate 361 and a plastic chip carrier layer 18. The metal layer 361 is shown with a ferrite shield 33 attached to the groove 32 and with a booster card antenna 24 formed (wound) directly within the ferrite shielded groove.

Alternatively, the coils of a booster antenna may be formed on, or within, a plastic layer. Ferrite material is formed or placed substantially only over the coil layout area to provide an RF shield and a metal layer can then be attached over the shielded coils to form a smart metal card with a limited amount of ferrite material.

FIG. 1B is a simplified partial cross-sectional view of a dual interface smart card 30. The contact pad 20c is on the same side/surface as the exterior (outer) surface of the metal layer 30. The card antenna 124 is shielded with a ferrite layer.

The ferrite may be applied as a die cut sheet or as a ferrite slurry which will harden under UV exposure or after the solvent is driven off. Substrate 30 is formed with a through bore 30a, which is shaped to receive an RFID module 20, which contains a microprocessor chip 20a, an antenna 20b and a contact pad 20c. Pad 20c is a conventional contact pad used in contact-type smart cards and is positioned to engage contacts in a card reader when the smart card is inserted therein. Antenna 20b is shown to project below metal substrate 30, for example, by about 0.01 inch.

Formed below substrate 30 is a plastic layer 134 having an antenna 124 formed by winding the coils (windings) 24a within a plastic layer 134. Layer 134 is formed with a recess shaped to receive the portion of antenna 20b that extends below substrate 30. This permits antenna 20b to extend in close proximity to antenna 124.

Preferably, the ferrite shield 33 extends laterally beyond winding 124 by at least 0.005 inches, in order to ensure that substrate 30 will not interfere with transmission or reception by antenna 124.

As shown in FIG. 1C, a metal-containing card body may include the following structure:

A metal layer 30 is intended to serve as the top layer of a card. The metal layer 30 has a top (front) surface 301 and a bottom (back) surface 302 and a thickness (D) which may range from less than 0.01 inches to more than 0.02 inches.

A plug 434 of any material which does not interfere with RF transmission is formed or shaped to conform to the dimensions of the hole/opening to fill the cut out region. Plug 434 is processed and functions to secure the IC module. The interior walls of the hole and/or the exterior walls of the plug 434 is/are coated with a suitable adhesive so the plug 434 adheres firmly to the walls of the hole/opening throughout the processing of the metal layer in the formation of the card. The plug 434 may be made of any thermoplastic material such as PET, PVC or other polymer or any material such as epoxy resins and a ceramic.

An adhesive layer 42 is used to attach a ferrite layer 44 to the back surface 302 of layer 30. An adhesive layer 46 is used to attach a plastic (e.g., PVC) layer 48 which contains and/or on which is mounted a booster antenna 47 to the ferrite layer. Layers 42, 44, 46, and 48 and the booster antenna 47 are formed in a similar manner as the corresponding number components shown in FIG. 2 and serve the same or similar functions. The assembly comprising layers 30, 42, 44, 46 and 48 is laminated to form a card assembly.

A layer 52, which includes a signature panel and a magnetic stripe, may be attached to layer 48 before or after lamination.

IC module 7 which includes a chip 7a and a chip antenna 7b and a set of contacts 7c is positioned within hole/opening and is glued in place. Physical connections extend between the booster antenna 47 and the chip antenna 7b.

Unlike other designs known in the art, a deliberately large gap between the chip and the sides of the opening is not required to provide suitable RF functionality.

As outlined in U.S. Pat. No. 10,289,944, the plug provides support for the IC module and a degree of electrical insulation and isolation from the metal layer.

Shielded Laminated Smartcard

FIG. 2 shows a shielded, laminated metal laminated shielded card (SC) 1600B having two coupling frame metal layers and a front face (ML1) which is a continuous metal layer (no slit). Some of the metal layers are the same (or similar) to those shown in the construction of FIG. 16A of U.S. Pat. No. 10,193,211.

Notably different, however, is that the top metal layer (ML1) does not have a slit (there is no "S1" in this embodiment). The second metal layer (ML2) has a slit (S2), and the third metal layer (ML3) has a slit (S3), as in the construction of FIG. 16A of U.S. Pat. No. 10,193,211, and the various layers may be held together (laminated) with layers of adhesive, as shown. The dimensions of the various layers may be similar to those in the construction of FIG. 16A of U.S. Pat. No. 10,193,211.

The front face (ML1) 1620A, as shown, does not have a slit, and may interact with the reader electromagnetic field and produce induced eddy currents within its body. These eddy currents will normally produce a counter-field resulting in reduction or blocking of the communication between the transponder chip module and reader. To offset this, a shielding layer (SL) 1640 of suitably chosen magnetic material may be placed between the front continuous metal layer and the coupling frame layers (ML2, ML3) of the card. A layer of adhesive 1622 having a thickness of 20 μm may be disposed between the front metal layer ML1 and the shielding layer SL. A layer of adhesive 1623 having a thickness of 20 μm may be disposed between the shielding layer SL and the second metal layer ML2.

The front metal layer (ML1) may have a thickness of 200 μm, rather than 300 μm (or 320 μm) as in the construction of FIG. 16A of U.S. Pat. No. 10,193,211. The shielding layer (SL) may have a thickness of approximately 50-200 μm, such as 100 μm (which was gained by making the front layer thinner than in the construction of FIG. 16A). In this manner the coupling frames will be shielded from the attenuating front metal layer and continue to function in conjunction with the transponder chip module (TCM).

Other elements of the FIG. 2 embodiment, such as the second metal layer ML2 and third metal layer ML3 may be substantially similar or identical to corresponding (similarly numbered) elements in the embodiment of FIG. 16A of U.S. Pat. NO. 10,193,211. Generally, the top metal layer ML1 of FIG. 16A of U.S. Pat. No. 10,193,211 is replaced by a metal layer ML1 without a slit and a shielding layer SL.

The module antenna (MA) of the transponder chip module (TCM) may reside in a plane that lies below the continuous front metal layer (ML1). The module antenna (MA) may be surrounded on all edges (sides) by magnetic shielding material (not shown) to reduce the attenuation from eddy currents in the front metal layer (ML1). In this manner the performance of the magnetic shielding material may be maximized and the coupling of the transponder chip module (TCM) with the coupling frame layers (ML2, ML3) may be improved.

The prior art is silent on the retention of the metal sound with the card body comprising of material (several adhesive layers and a magnetic shielding layer) which dampens the drop acoustics of the metal card.

This disclosure further relates to dual interface metal transaction cards comprising two metal layers with at least one slit in each metal layer separated by an adhesively coated dielectric and laminated to synthetic layers to form a metal face transaction card with the objective that the drop acoustics of the metal transaction card sound like metal and not plastic. Retention of the metal sound requires careful selection of the adhesive system and the dielectric (carrier); the thickness of the adhesive layers and the carrier; the melt temperature of the adhesive; the crosslinking processing stage of the adhesive; the choice of each metal layer and their thickness; the choice and thickness of the synthetic layers and the lamination cycle or cycles and its or their respective lamination parameters (pressure, temperature and dwell time). The choice of the adhesive system and the carrier also impacts the ageing of the milling tools used to reduce an inlay of a given format to individual card bodies, in chamfering the card body edges at an angle, and forming a pocket in each card body for later insertion of a dual interface chip module.

Metallic Acoustic Sound of a Metal Face or Hybrid Transaction Card

It is an object of the current invention that the metal card body retains its metallic acoustic sound when tossed on a hard surface, by careful selection of the adhesive system and dielectric between metal layers, the type of metal used in the card construction, and any panel or insert for fitting into the metal card body. A metal card with a dielectric or an adhesive layer between metal layers renders the drop acoustics of the card to sound like plastic rather than metal, because of the dampening effect of the insulating medium between the metal layers.

The use of radio frequency shielding material (e.g. a ferrite layer) in combination with a booster antenna circuit will also have an impact on the drop acoustics of the metal card, especially if these elements are placed or sandwiched between a front face metal layer without slit and an intermediate metal layer with a slit.

Different metal layers may be used in the card construction, such as the combination of different metals such as titanium and stainless steel. Other metals, such as brass may also be chosen.

The dielectric carrier layer may be constructed from a 25 μm Polyethylene Naphthalate (PEN) film coated on both sides with a 25 μm coating of an epoxy based thermosetting adhesive system.

The adhesive system plays an important role in maintaining the drop acoustics of the metal card. A hard setting epoxy on a dielectric carrier layer such as PEN, PET or PC has the advantage that after laminating the metal layers (e.g. 25-up format) together, the epoxy does not re-melt and become tacky from the heat generation caused by the CNC milling (singulation process) in reducing the 25-up laminated metal inlay to individual card bodies.

The stack-up construction of a "Metal Face" transaction card having a front metal surface with a flat and solid color The hard coat layer is characterized by significant UV absorption. The clear or colored UV hard coat layer may also be sprayed on, mist-coated, or screen printed to the metal surface.

The slit in each metal layer can be filled with a UV curing epoxy or a two-component adhesive, dispensed as a microfluidic droplet for in situ bonding of the slit under pressure and vacuum control.

FIG. 3 (FIG. 14 of U.S. Ser. No. 16/993,295—now US 2021/0049431) shows a "Metal Face" transaction card showing a stacking of layers for a transaction card construction. Several layers in the stack-up of the card are shown, and labeled. Two metal layers are separated by a double-sided adhesively coated dielectric carrier layer (PET or PEN layer, with adhesive on both sides). An inductive coupling chip module (ICM, or TCM) for inserting in openings (module opening) in the layers of the transaction card is shown.

To maintain the metal sound of a metal containing transaction card with two metal layers adhesively attached to each other, a PEN carrier may be used with a special adhesive system.

For example, a medium may be constructed from 25 μm Polyethylene Naphthalate (PEN) film coated on both sides with a 25 μm coating of an epoxy based adhesive system which is thermosetting. The adhesive coating is flexible, non-tacky and of low friction.

The stack-up construction of the card body may comprise of the following layers:

| | |
|---|---|
| UV HARD COAT | UV Hard Coat with low activation temperature on a Release Carrier Layer, the thickness of the UV Diamond Coat is 2-3 μm |
| ARTWORK | Printed on the front face metal layer (6 mils) of the metal inlay The artwork on the front face metal layer comprising Ink: ~15 μm, digitally printed flexible ink and Primer: ~10 μm, digitally printed primer |
| METAL INLAY | 2 Metal Layers of 6 mils (Printed Metal Layer) and 10 mils, each metal layer having a slit with a specific design, with the metal layers separated by a 75 μm adhesively coated PEN dielectric) ~485 μm One layer of Metal is Stainless Steel, while the other layer may be Titanium The "P1" opening in the top metal layer is for receiving the module tape (and contact pads) portion of an Inductive Coupling Chip Module (ICM) or Transponder Chip Module (TCM). The "P2" opening in the bottom metal layer is for receiving the mold mass portion of the Inductive Coupling Chip Module (ICM) or Transponder Chip Module (TCM). The "P1" opening is typically larger (in area) than the "P2" portion. |
| ADHESIVE | Adhesive layer ~25 μm |
| CLEAR PVC | Transparent PVC, digitally or lithographically printed ~150 μm |
| PRINTED INFO | Ink: ~15 μm Primer: ~10 μm |
| OVERLAY with MAGNETIC STRIPE | Overlay with magnetic stripe: 65 μm |
| ELEMENTS (not shown) | Signature panel and hologram |

Total thickness: 30.6 mils (778 μm) Pre-lamination may have a thickness of 6 or 8 mils supported by an underlying metal layer with a thickness of 12 or 10 mils. To maintain the metal sound integrity, the traditional dielectric of a PET film is replaced by a PEN film with a front and rear adhesive coating, in addition two different metal substrates may be used, namely Titanium and Stainless Steel to optimize the sound.

The metal cards can be digitally printed using UV inks (primer and stretchable or rigid inks) and protected by a UV hard coat (lamination film). Or the metal layer can be screen printed with a primer and ink, protected by a lacquer, enamel or resin, and baked at elevated temperature. The protective resin may for example be an acrylic coating, and may be laser engravable.

FIG. 4 (FIG. 16 of U.S. Ser. No. 16/993,295—now US 2021/0049431) shows a "Metal Face" transaction card showing a stacking of layers for a transaction card construction. Several layers in the stack-up of the card are shown, and labeled. The two metal layers are separated by a double-sided adhesively coated dielectric carrier layer. An inductive coupling chip module (ICM or TCM) for inserting in openings (module opening) in the layers of the transaction card is shown.

FIG. 5 (FIG. 17 of U.S. Ser. No. 16/993,295—now US 2021/0049431) shows a "Metal Face" transaction card showing a stacking of layers for a transaction card construction. Several layers in the stack-up of the card are shown, and labeled. The two metal layers are separated by three layers, comprising a first thermosetting adhesive layer, a dielectric layer, and a second thermosetting adhesive layer. An inductive coupling chip module (ICM or TCM) for inserting in openings (module opening) in the layers of the transaction card is shown.

The metal layers may be pre-laminated together with the first thermosetting adhesive layer, the dielectric carrier layer as an insulation separation layer, and the second thermosetting adhesive layer.

The adhesive structure on both sides of the PEN carrier may be delivered after the B-stage process, and the adhesive layers may be reactivated in the lamination press process to achieve a non-reversible C-stage in which the adhesive does not melt, flow or become sticky.

A laminate as illustrated in FIG. 4 may be constructed from 25 µm Polyethylene Naphthalate (PEN) coated on both sides with a 25 µm coating of an epoxy based adhesive system, with a press lamination temperature of 170° C. for 30 minutes at a pressure of 10.5 kg/cm$^2$ (150 psi). As the operating temperature of the laminate is higher than the permissible processing temperature of the synthetic layers (e.g. PVC), the metal layers may be prelaminated first, before final lamination with the synthetic layers.

It is also feasible to use laminates based on 25 µm (1 mil) Polyethylene Naphthalate (PEN) film coated with low flow modified epoxy polyester adhesive, double sided, with a melt point of 105° C.±1° C. The shelf life of the laminate is typically 6 months, however, the adhesive will continue to cure at ambient temperature and raise the melt point as it continues to cross link. This can be slowed (or basically stopped) by storing in a freezer.

The thickness of the epoxy layer(s) and the thickness of the carrier layer play an important role in maintaining the metallic sound of a metal containing transaction card. The melt temperature of the thermosetting epoxy should match the glass transition temperature of the synthetic layers which are laminated to the metal layer or layers.

In summary, to maintain the metal sound of a metal containing transaction card with two metal layers adhesively attached to each other, a dielectric carrier layer may be used with a special thermosetting adhesive system.

The thermosetting resin and the choice of dielectric have an impact on the drop acoustics of a metal transaction card and on the life of the milling tools used to produce metal card bodies.

Before laminating metal layers in a card stack-up construction using an adhesive system (double-sided coated dielectric film) to bond the metal layers together, the adhesive system comprises of an uncured thermosetting epoxy resin in which the material softens when heated in the lamination press. The adhesive system before the lamination process is in an intermediate stage (B-stage) in the reaction of the thermosetting epoxy resin. After lamination, the characteristics of the final cured resin in the C-stage exhibits high thermal properties and does not soften under the influence of heat during the CNC milling process.

The dielectric layer may be constructed from a 25 µm Polyethylene Naphthalate (PEN) film coated on both sides with a 25 µm coating of an epoxy based thermosetting adhesive system.

The dielectric may also be made from a fiber (e.g. glass or carbon) or any suitable composite material.

Different metal layers with different acoustic properties may be used in the card construction, such as the combination of titanium and stainless steel.

The adhesive, thermosetting epoxy (hot-cured resin, highly-crosslinked) has a morphology (microstructure) which consists of a continuous phase, and which does not dampen the acoustics of the metal sound.

Some Additional Comments

Some of the card embodiments disclosed herein may have two metal layers, separated by a dielectric coating or an insulating layer, rather than a single metal layer. The two metal layers may comprise different materials and may have different thicknesses than one another. For example, one of the metal layer may be stainless steel while the other metal layer may be titanium. In this manner, the "drop acoustics" of the metal card body may be improved, in that the card, when dropped or tapped (edgewise) on a hard surface, sounds like a solid metal card (making a ringing or tinkling sound), rather than like a plastic card (making a "thud").

FIG. 6A of U.S. Ser. No. 17/092,332 is a diagram of the stack-up construction of a dual interface metal face smartcard 600A with contactless tap to pay function on one side of the card body, having a front face solid metal layer 630 without a discontinuity attached to underlying layers by means of an adhesive system which does not dampen the inherent metal sound of the card body. The metal interlayer 650 has a slit (S), a module opening (MO) 614 to accept the insertion of a transponder chip module 610 for inductive coupling.

The stack-up construction of the card body (CB) 600A (smartcard (SC) or transaction card (TC)) with a front face continuous metal layer without a discontinuity may comprise the following layers:

610: Dual-interface transponder chip module (TCM) or inductive coupling chip module (ICM);

612: P1 Module opening (MO);

614: P2 Module opening (MO);

620: Slit (S) in the metal interlayer acting as a coupling frame for contactless communication;

676: Operation of laser marking the rear overlay layer with personalization data;

624: Protective hard top-coat layer (5-10 µm)—a hard top-coat lamination film or a deposited coating (ink, varnish or a polymer) which can be laser marked or laser engraved;

626: A print layer (25 µm) which may compose of: (i) a digital, silk screen, lithographic or thermo-graphic layer of clear or colored ink (ii) a baked-on-ink layer, (iii) a PVD or DLC coating, or (iv) a combination thereof, including an adhesion promoter or primer applied between the metal layer 630 and subsequent coatings;

630: Front face metal layer with a module opening 612 and without a slit ("continuous") which may have a print layer 626, typically the metal layer having a thickness of 150 µm;

638: Adhesive layer (25 µm)—thermosetting epoxy—to attach the ferrite layer 640 to the rear side of the front face metal layer 630;

640: High permeability magnetic sheet shielding layer with a thickness of 50 µm or 100 µm which may compose of the following: calcium carbonate ($CaCO_3$), silicon dioxide ($SiO_2$), magnesium fluoride ($MgF_2$), SiO2, chromium (Cr) and iron (Fe), to offset the effects of electromagnetic shielding caused by the front face metal layer 630;

648: Adhesive layer (25 µm)—thermosetting epoxy—to attach the ferrite layer 640 to the front side of the metal interlayer 650 with slit 620;

650: Metal interlayer or layers with a slit 620 (300-350 µm);

If there are two metal layers with slits, they may be separated by a dielectric or insulating layer, such as adhesive.

658: Adhesive layer (25 μm)—thermosetting epoxy—to attach the metal interlayer 650 to the front side of the synthetic layer 660;

660: Transparent, translucent or white synthetic layer (e.g. PVC, PC, PETG), typically having a thickness of 125 or 150 μm;

662 primer;

664 ink (printed information (PI));

The positions of 662 and 664 may be interchangeable depending on the printing process.

670: Laser engravable overlay layer (PVC), typically having a thickness of 64 μm;

674: Magnetic stripe;

Security elements (signature panel and hologram) are not shown.

FIG. 6B of U.S. Ser. No. 17/092,332 is a modified diagram of FIG. 6A showing a stack-up construction of a dual interface metal face smartcard 600B with contactless tap to pay function on one side of the card body, having a front face solid metal layer 630 without a discontinuity with its rear surface having a protruding metal section (a boss) 632, which may be off-center. The metal interlayer 650 has a slit (S), a module opening (MO) 614 to accept the insertion of a transponder chip module 610 for inductive coupling.

The boss 632 is a portion of the metal layer 630 that is deformed to protrude downward from the metal layer 630, and fit snugly into a corresponding hole 641 in the underlying ferrite layer 640. This helps protect the card body against delamination. Contrast this with FIGS. 1A,B having ferrite 32 protruding up into the metal 30 above. This feature (the metal layer protruding down into the underlying shielding layer) may be applied to other embodiments shown herein, whether or not explicitly shown and described.

The stack-up construction of the card body (CB) 600B (smartcard (SC) or transaction card (TC)) with a front face continuous metal layer without a discontinuity may comprise the following layers:

610: Transponder chip module (TCM) or inductive coupling chip module (ICM);

612: P1 Module opening (MO);

614: P2 Module opening (MO);

620: Slit (S) in the metal interlayer acting as a coupling frame for contactless communication;

676: Operation of laser marking the rear overlay layer with personalization data;

624: Protective hard top-coat layer (5-10 μm)—a hard top-coat lamination film or a deposited coating (ink, varnish, enamel, lacquer or a polymer) which can be laser marked or laser engraved;

626: A print layer (25 μm) which may compose of: (i) a digital, silk screen, lithographic or thermo-graphic layer of clear or colored ink, (ii) a baked-on-ink layer, (iii) a PVD or DLC coating, or (iv) a combination thereof, including an adhesion promoter or primer applied between the metal layer 630 and subsequent coatings;

630: Front face metal layer without a slit which may have a print layer 626, typically the metal layer having a thickness of 150 μm—with its rear surface having an off-center protruding metal section (a boss) 632 (e.g. 25 mm×30 mm) having a stepped ledge 636 having a height equal to the thickness of the underlying adhesive layer 638 and the ferrite layer 640, approximately 75 μm or 125 μm;

638: Adhesive layer (25 μm)—thermosetting epoxy—to attach the ferrite layer 640 to the rear side of the front face metal layer 630 having an opening for the protruding metal section 632;

640: High permeability magnetic sheet layer with a thickness of 50 μm or 100 μm which may compose of the following: calcium carbonate ($CaCO_3$), silicon dioxide ($SiO_2$), magnesium fluoride ($MgF_2$), SiO2, chromium (Cr) and iron (Fe), to offset the effects of electromagnetic shielding caused by the front face metal layer 630;

648: Adhesive layer (25 μm)—thermosetting epoxy—spanning the entire width and length of the card body, being assembled to the protruding metal section (a boss) 632 on the rear side of the front face metal layer 630 and to the ferrite layer 640 which is flush with the outer surface of the protruding metal section (a boss) 632;

650: Metal interlayer or layers with a slit 620 (300-350 μm); a metal layer with a module opening (MO) and a slit (S) may be referred to as a coupling frame (CF)

658: Adhesive layer (25 μm)—thermosetting epoxy—to attach the metal interlayer 650 to the front side of the synthetic layer 660;

660: Transparent, translucent or white synthetic layer (e.g. PVC, PC, PETG), typically having a thickness of 150 μm;

662 primer;

664 ink (printed information (PI));

The position of 662 and 664 may be interchangeable depending on the printing process.

670: Laser engravable overlay layer (PVC), typically having a thickness of 64 μm;

674: Magnetic stripe;

Security elements (signature panel and hologram) are not shown.

Thus, in FIG. 6B, there is a continuous metal layer 630 with an opening 612 and without a slit, under which is a ferrite shielding layer 640, under which is a discontinuous metal layer (or frame) 650 with slit and opening.

FIG. 6C of U.S. Ser. No. 17/092,332 is a modified diagram of FIG. 6B showing a stack-up construction of a dual interface metal face smartcard 600C with contactless tap to pay function on one side of the card body, having a front face solid metal layer 630 without a discontinuity with its rear surface having a protruding metal layer 633 which fits into a frame comprising of anti-shielding material. The metal interlayer 650 has a slit (S), a module opening (MO) 614 to accept the insertion of a transponder chip module 610 for inductive coupling.

The stack-up construction of the card body (CB) 600C (smartcard (SC) or transaction card (TC)) with a front face continuous metal layer without a discontinuity may comprise the following layers:

610: Transponder chip module (TCM) or inductive coupling chip module (ICM);

612: P1 Module opening (MO);

614: P2 Module opening (MO);

620: Slit (S) in the metal interlayer acting as a coupling frame for contactless communication;

676: Operation of laser marking the rear overlay layer with personalization data;

624: Protective hard top-coat layer (5-10 μm)—a hard top-coat lamination film or a deposited coating (ink, varnish, enamel, lacquer or a polymer) which can be laser marked or laser engraved;

626: A print layer (25 μm) which may compose of: (i) a digital, silk screen, lithographic or thermo-graphic layer of clear or colored ink, (ii) a baked-on-ink layer, (iii) a PVD or DLC coating, or (iv) a combination thereof, including an adhesion promoter or primer applied between the metal layer 630 and subsequent coatings;

630: Front face metal layer without a slit which may have a print layer 626, typically the metal layer having a thickness of 150 µm—with its rear surface having a protruding metal layer 633 having a stepped ledge 637 having a height equal to the thickness of the underlying adhesive frame layer 638 and the ferrite frame layer 640, approximately 75 µm or 125 µm;

638: Adhesive frame layer (25 µm)—thermosetting epoxy—to attach the ferrite frame layer 640 to the rear side of the front face metal layer 630 having an opening for the protruding metal layer 633;

640: High permeability magnetic sheet layer with a thickness of 50 µm or 100 µm made of polymer magnetic sheet technology to offset the electromagnetic attenuation caused by the front face metal layer 630; This ferrite layer 640 has an oversize hole 643 (compare 641, FIG. 6B) for receiving the protrusion from the overlying metal layer 630. The hole is very large, such as 35 mm by 65 mm or smaller, resulting in a band (or ring) of ferrite material, approximately 10 mm wide, being disposed around the periphery of the underlying supporting layer. (The ID-1 spec for the size of the card is approximately 86 mm×54 mm.)

648: Adhesive layer (25 µm)—thermosetting epoxy— spanning the entire width and length of the card body, being assembled to the protruding metal layer 633 on the rear side of the front face metal layer 630 and to the ferrite frame layer 640 which is flush with the outer surface of the protruding metal layer 633;

650: Metal interlayer or layers with a slit 620 (300-350 µm); a metal layer with a module opening (MO) and a slit (S) may be referred to as a coupling frame (CF)

658: Adhesive layer (25 µm)—thermosetting epoxy—to attach the metal interlayer 650 to the front side of the synthetic layer 660;

660: Transparent, translucent or white synthetic layer (e.g. PVC, PC, PETG), typically having a thickness of 150 µm;

662 primer;

664 ink (printed information (PI));

The position of 662 and 664 may be interchangeable depending on the printing process.

670: Laser engravable overlay layer (PVC), typically having a thickness of 64 µm;

674: Magnetic stripe;

Security elements (signature panel and hologram) are not shown.

FIG. 7 (FIG. 7A of U.S. Ser. No. 17/092,332) is a diagram (exploded perspective view) of the stack-up construction of a dual interface metal face smartcard 700A with contactless "tap-to-pay" function on one side of the card body having a booster antenna circuit 744 mounted on a magnetic shielding layer 742 in combination with a metal interlayer 750 having a slit to function as a coupling frame. The front face solid metal layer 730 is continuous metal layer with no discontinuity. The metal interlayer 750 has a slit (S) 720, a module opening (MO) 714 to accept the insertion of a transponder chip module 710 with its module antenna inductively coupling with the coupler coil of the booster antenna 744 and the slit 720 in the metal interlayer 750. The metal interlayer 750 with slit may be replaced by a coupling frame antenna (CFA).

The stack-up construction of the card body (CB) 700A (smartcard (SC) or transaction card (TC)) with a front face continuous metal layer without a discontinuity may comprise the following layers (all dimensions are exemplary and approximate):

710: dual-interface Transponder Chip Module (TCM) or inductive coupling module (ICM);

712: P1 Module opening (MO), in front face metal layer (ML1) 730 without a slit

714: P2 Module opening (MO), in metal interlayer or layers 750 with a slit 720

720: Slit (S) in the metal interlayer 750 acting as a coupling frame for contactless communication;

776: Operation of laser marking the rear overlay layer 770 with personalization data; compare 676 in FIGS. 6A, B, C

724: Protective hard coat layer (5-10 µm)—a hard topcoat lamination film or a deposited coating (ink, varnish, enamel, lacquer or a polymer) which can be laser marked or laser engraved;

726: A print layer (25 µm) which may comprise: (i) a digital, silk screen, lithographic or thermo-graphically layer of clear or colored ink, (ii) a baked-on-ink layer, (iii) a PVD or DLC coating, or (iv) a combination thereof, including an adhesion promoter or primer applied between the metal layer 730 and subsequent coatings;

730: Front face metal layer without a slit ("continuous"), which may have the print layer 726 disposed on it. A typical thickness for this metal layer may be 150 µm;

738: Adhesive layer (25 µm)—thermosetting epoxy—to attach the ferrite layer 742 with booster antenna circuit 744 to the rear side of the front face metal layer 730;

742: High permeability magnetic sheet shielding layer with a thickness of 50 µm or 100 µm which may compose of the following: calcium carbonate ($CaCO_3$), silicon dioxide ($SiO_2$), magnesium fluoride ($MgF_2$), SiO2, chromium (Cr) and iron (Fe), to offset the effects of electromagnetic shielding caused by the front face metal layer 730 and having a booster antenna circuit 744 assembled to its face downside;

744: Booster antenna circuit assembled on a high permeability, low magnetic loss ferrite layer 742 comprising of a perimeter coil, a coupler coil and a set of trimming capacitors (not shown, are very small);

The booster antenna circuit 744 is comparable to a coupling frame antenna (CFA), but has multiple turns (windings) and is a booster antenna (such as wire embedded or etched). The CFA is a single turn (or winding). The booster antenna "circuit" is similar to a booster antenna as disclosed in U.S. Pat. No. 9,033,250, but has capacitors integrated into it.

748: Adhesive layer (25 µm)—thermosetting epoxy— spanning the entire width and length of the card body, being assembled to the rear side of the booster antenna circuit 744 and the metal interlayer 750 with a slit 720;

750: Metal interlayer or layers with a slit 720; The metal interlayer may be two metal layers with slits, separated by a dielectric (insulating) layer, which may be adhesive. The thickness of the metal interlayer may be 300-350 µm.

A metal layer with slit and module opening may be referred to as a "coupling frame" (CF). See, e.g., U.S. Pat. Nos. 9,475,086; 9,798,968. And, two or more coupling frames may be stacked up, for example as in U.S. Pat. No. 9,836,684, which also discussed the need for reinforcing the metal layer at the position of the slit, which may be regarded as a mechanical defect.

758: Adhesive layer (25 µm)—thermosetting epoxy—to attach the metal interlayer 750 to the front side of the synthetic layer 760;

760: Transparent, translucent or white synthetic layer (e.g. PVC, PC, PETG), typically having a thickness of 150 µm;

762 primer;

764 ink (printed information (PI));

The positions of 762 and 764 may be interchangeable (exchanged/swapped with one another).

770: Laser engravable overlay layer (PVC), typically having a thickness of 64 μm;

774: Magnetic stripe;

Security elements (signature panel and hologram) are not shown.

In this, and other embodiments disclosed herein, the card body may have a metal layer (or layers) which are substantially the full size of the card body, and the metal layer(s) have a module opening and may have a slit extending from a peripheral edge of the metal layer(s) to the module opening to facilitate the metal layer(s) to function as coupling frame(s) to permit contactless capability. In some embodiments, a metal layer may have a module opening and no slit.

In this, and other embodiments disclosed herein, the construction of a card body may be shown, in an "exploded" perspective view, showing the various layers of the card body from the front (top) of the card body to the rear (bottom) of the card body. The constructions may be described from front-to-back, with some layers being described as being behind other layers.

In FIG. 7 (FIG. 7A of U.S. Ser. No. 17/092,332), the continuous metal layer 730 attenuates the electromagnetic field and so in order to passively power a transponder chip module by inductive coupling, shielding material 742 is required in the stack-up construction. An important aspect of the adhesive layer 738 between the metal layer 730 and the shielding layer 742 is the function as a dielectric spacer (738). The thicker the shielding layer, the greater the RF performance. The greater the distance between the metal layer 730 and the shielding layer 742, the greater is the frequency uplift of the system resonance frequency and the RF performance in terms of activation distance. The activation distance may be further enhanced by a coupling frame or discontinuous metal layer 750 positioned underneath the booster antenna circuit 744, separated by an adhesive layer 748. The coupling frame or discontinuous metal layer 750 also uplifts (raises) the system resonance frequency of the metal transaction card 700A. This (the function of the dielectric spacer) may be applicable to some of the other embodiments disclosed herein, whether or not explicitly disclosed.

Also, the slit in the discontinuous metal layer 750 can be disguised with a primer, printed ink and a protective coating (ink, varnish, enamel, lacquer or a polymer). This (disguising the slit in a discontinuous metal layer) may be applicable to some of the other embodiments disclosed herein, whether or not explicitly disclosed.

Regulating the Card Body Weight while Increasing the Thickness of the Dielectric Spacer By way of an example in FIG. 7, the weight of a metal transaction card is primarily determined by the combined weight of the continuous metal layer 730 and the discontinuous metal layer 750. By increasing the thickness of the dielectric spacer 738 between the continuous metal layer 730 and the shielding layer 742, and or increasing the thickness of the shielding layer 742 to enhance the RF performance, it is necessary to reduce the thickness of the metal layers which reduces the card body weight or to remove the synthetic layers from the rear side of the card body while maintaining the thickness of the metal layers. By removing the synthetic layers 758 (adhesive layer 25 μm) and 760 (transparent, translucent or white plastic layer 150 μm) and replacing them with a hard top coat lamination film ~10 μm (laser reactive) with an outer adhesive layer which can accept printed information (PI) 764 ink, with the option to attach a laser engravable overlay layer 770 (PVC) typically having a thickness of 64 μm.

FIG. 8A is a diagram (exploded perspective view) of the stack-up construction of a dual interface metal face smartcard 800A with contactless tap to pay function from the rear side of the card body, having a booster antenna circuit (BAC) 844 mounted on a magnetic shielding layer 842 with both components sandwiched between a front face solid metal layer 830 and a rear metal interlayer 850.

The front face solid metal layer 830 is continuous metal layer with no discontinuity. The rear metal interlayer 850 is a discontinuous metal layer having a module opening (MO) 814 and a slit (S) 820 to function as a coupling frame for contactless communication. The module opening (MO) 814 accepts the placement of a transponder chip module (TCM) 810 with its module antenna (MA) inductively coupling with the coupler coil (CC) of the booster antenna circuit (BAC) 844 and overlapping the module opening (MO) 814 and (S) slit 820 in the metal interlayer 850. The dimensional arrangement of the module antenna (MA), coupler coil (CC) and module opening (MO) is one of concentricity.

The stack-up construction of the card body (CB) 800A (smartcard (SC) or transaction card (TC)) with a front face continuous metal layer without a discontinuity and a rear discontinuous metal layer with a discontinuity may comprise the following layers (all dimensions and parameters are exemplary and approximate):

810: Dual-interface transponder chip module (TCM) or inductive coupling module (ICM);

812: Module opening (MO) with a P1 metal ledge in the front face metal layer (ML) 830 without a slit;

814: Module opening (MO) with a P2 metal ledge in the rear metal interlayer 850 with a slit 820;

876: Operation of laser marking the laser reactive protective layer 824 with personalization data;

824: Laser reactive protective layer (10 μm)—a hard top-coat lamination film or a deposited coating (ink, varnish, enamel, lacquer or a polymer as a matte or gloss finish) which can be laser marked or laser engraved;

825: Optionally a hard coat layer of rigid ink for scratch protection (10 μm) as opposed to stretchable ink used in the deposition of the print layer 826;

826: A print layer (35 μm) which may comprise: (i) a digital, silk screen, lithographic or thermo-graphic layer of clear or colored ink, (ii) a baked-on-ink layer, (iii) a PVD or DLC coating, or (iv) a combination thereof, including an adhesion promoter or primer applied between the metal layer 830 and subsequent print/coating layers;

830: Front face metal layer without a slit ("continuous"), which may have the print layer 826 disposed on it. A typical thickness for this metal layer may be 203 μm;

838: Adhesive layer (25 μm)—thermosetting epoxy—to attach the ferrite layer 842 with the booster antenna circuit (BAC) 844 to the rear side of the front face metal layer 830;

842: High permeability magnetic sheet shielding layer with a thickness of 50 μm or 100 μm which may compose of the following: calcium carbonate ($CaCO_3$), silicon dioxide ($SiO_2$), magnesium fluoride ($MgF_2$), SiO2, chromium (Cr) and iron (Fe), to offset the effects of electromagnetic shielding caused by the front face metal layer 830 and having a booster antenna circuit 844 assembled to its face downside by means of an adhesive layer 843;

844: Closed loop booster antenna circuit (chemically etched copper tracks, plated copper tracks, conductive printed tracks, wire embedding or equivalent) attached to the high permeability magnetic shielding layer, low magnetic loss ferrite layer 842 (50 μm or 100 μm in thickness) by means of an adhesive layer 843 (50 μm), with the booster antenna circuit (BAC) comprising of a perimeter coil, a coupler coil and a set of parallel plate trimming capacitors (capacitor bank for tuning not shown), with the booster antenna circuity (BAC) being assembled on a PET carrier layer (23 μm) having a top antenna layer (perimeter coil with 10-13 windings (copper track width: 150-300 μm, spacing between tracks: 100 μm, copper track thickness: 12 μm), vertical interconnects and the upper capacitor plate electrodes) with said top antenna layer (35 μm) facing the magnetic shielding layer 842, and having a bottom antenna layer (coupler coil with 10-15 windings (copper track width: 100-150 μm, spacing between tracks: 100 μm, copper track thickness: 12 μm), connection jumpers and the lower capacitor plate electrodes) with said bottom antenna layer (35 μm) facing the rear metal interlayer 850 acting as a coupling frame;

Notably, the arrangement of the perimeter coil and the coupler coil on the PET carrier layer being respectively positioned on the top and bottom surfaces thereof may be interchanged or portions of their antenna structures may be located on both sides of the carrier layer;

The booster antenna circuit (BAC) is similar to a booster antenna as disclosed in U.S. Pat. No. 9,033,250, but the circuitry is a closed loop with no open-ended antenna elements and having an integrated parallel plate capacitor bank for frequency trimming.

848: Adhesive layer (25 μm)—thermosetting epoxy—spanning the entire width and length of the card body, being assembled to the bottom side of the booster antenna circuit (BAC) 844 and the metal interlayer 850 with a module opening (MO) 814 and slit (S) 820;

850: Metal interlayer with a module opening MO 814 and a slit (S) 820 having a thickness of approximately 152 μm is attached to the rear synthetic layers by an adhesive layer 858;

858: Adhesive layer (25 μm)—thermosetting epoxy—attaching the metal interlayer 850 to the top side of the synthetic layer 860;

860: Transparent, translucent, white or colored synthetic layer (e.g. PVC, PC, PETG), typically having a thickness of 125 μm;

862 primer;

864 ink (printed information (PI));

The position of 862 and 864 may be interchangeable depending on the printing process.

870: Laser engravable overlay layer (PVC) typically having a thickness of 60 μm;

874: Magnetic stripe mounted to the rear overlay layer 870;

876: Operation of laser marking to the rear overlay layer 870 with personalization data; and Security elements (signature panel and hologram) are not shown.

FIG. 8B is a modified diagram of FIG. 8A showing the stack-up construction of a dual interface metal face smartcard 800B with contactless tap to pay function from the rear side of the card body (CB), having a plastic slug 815 inserted into the laser cut module opening (MO) 814 in the rear metal interlayer 850, thus filling the void before lamination of the adhesive layer 858, print layer 860 and overlay layer 870 to the remaining card body assembly.

FIG. 8C is an exploded view of the magnetic shielding layer 842 with an adhesive layer 843 for attachment to the booster antenna circuit (BAC) 844.

FIG. 8D is an exploded view of the booster antenna circuit (BAC) 844 with its antenna elements (perimeter coil and coupler coil), parallel plate capacitor bank, jumpers and vertical interconnects on both sides on a PET carrier layer 844B. The booster antenna circuit (BAC) 844 on the PET carrier layer 844B has a top antenna layer 844A (perimeter coil, vertical interconnects and the upper capacitor plate electrodes) with the top antenna layer facing the adhesive layer 843 and the magnetic shielding layer 842, and having a bottom antenna layer 844C (coupler coil, connection jumpers and the lower capacitor plate electrodes) with the bottom antenna layer 844C facing the adhesive layer 848 and the rear metal interlayer 850 acting as a coupling frame.

FIG. 9A is a diagram (exploded perspective view) of the stack-up construction of a dual interface metal face smartcard 900 with contactless tap to pay function from the rear side of the card body, having a booster antenna circuit (BAC) 944 mounted on a magnetic shielding layer 942 with both components sandwiched between a front face metal layer 930 and a rear metal interlayer 950. The underside of the front face metal layer 930 has a protruding boss 932 which extends through the card assembly to the rear metal interlayer 950. The protruding boss 932 is attached to the rear metal interlayer 950 by means of the insulating adhesive layer 948. The module opening (MO) 914 in the rear metal interlayer 950 is stuffed with a plastic slug 915 to fill the void, before lamination of the adhesive layer 958, print layer 960 and overlay layer 970 to the remaining card body assembly.

The protruding boss 932 as a downward extension of the front face metal layer 930, could be replaced by a protruding boss as an upward extension of the rear metal interlayer 950.

The front face metal layer 930 is continuous metal layer with no discontinuity. The rear metal interlayer 950 is a discontinuous metal layer having a module opening (MO) 914, a metal ledge 916 and a slit (S) 920 to function as a coupling frame for contactless communication. The module opening (MO) 914 which has been laser cut has a plastic slug 915 to fill the gap. The module opening (MO) 914 accepts the placement of a transponder chip module (TCM) 910 with its module antenna (MA: 911) inductively coupling with the coupler coil (CC: 944C) of the booster antenna circuit (BAC: 944) and overlapping the module opening (MO) 914 and (S) slit 920 in the metal interlayer 950. The dimensional arrangement of the module antenna (MA: 911), coupler coil (CC: 944C) and the metal ledge 916 of the module opening (MO: 914) is one of concentricity.

The stack-up construction of the card body (CB: 900) (smartcard (SC) or transaction card (TC)) with a front face continuous metal layer without a discontinuity and a rear discontinuous metal layer with a discontinuity may comprise the following layers (all dimensions and parameters are exemplary and approximate):

910: Dual-interface transponder chip module (TCM) or inductive coupling module (ICM) with a rear face module antenna (MA: 911);

911: Module antenna with given number of turns or antenna tracks which may measure approximately 70 μm in width, with the spacing between adjacent turns of the spiral track measuring approximately 75 μm;

912: Module opening (MO) with a P1 metal ledge 913 in the front face metal layer (ML) 930 without a slit;

913: Metal ledge to provide mechanical support to the transponder chip module (910):

914: Module opening (MO) with a P2 metal ledge 916 in the rear metal interlayer 950 with a slit 920, with the module opening stuff with a plastic slug 915;

916: Metal ledge P2 surrounding the module opening (MO: 914) for inductive coupling with the module antenna (MA: 911);

976: Operation of laser marking the laser reactive protective layer 924 with personalization data;

924: Laser reactive protective layer (10 μm)—a hard top-coat lamination film or a deposited coating (ink, varnish, enamel, lacquer or a polymer as a matte or gloss finish) which can be laser marked or laser engraved;

925: Optionally a hard coat layer of rigid ink for scratch protection (10 μm) as opposed to stretchable ink used in the deposition of the print layer 926;

926: A print layer (35 μm) which may comprise: (i) a digital, silk screen, lithographic or thermo-graphic layer of clear or colored ink, (ii) a baked-on-ink layer, (iii) a PVD or DLC coating, or (iv) a combination thereof, including an adhesion promoter or primer applied between the metal layer 930 and subsequent print/coating layers;

930: Front face metal layer without a slit ("continuous"), which may have the print layer 926 disposed on it. A typical thickness for this metal layer may be 203 μm;

932: Plastic slug to fill the area in the module opening (MO) 914;

938: Adhesive layer (25 μm) with an opening for the protruding boss—thermosetting epoxy—to attach the ferrite layer 942 with the booster antenna circuit (BAC) 944 to the rear side of the front face metal layer 930;

942: High permeability magnetic sheet shielding layer with a thickness of 50 μm or 100 μm to offset the effects of electromagnetic shielding caused by the front face metal layer 930 and having a booster antenna circuit 944 assembled to its face downside by means of an adhesive layer 943, and in addition having an opening 941 for the protruding boss 932;

944: Closed loop booster antenna circuit attached to the high permeability magnetic shielding layer 942 by means of the adhesive layer 943, with the booster antenna circuit (BAC) comprising a perimeter coil (PA, 944A), a coupler coil (CC, 944C), a set of parallel plate trimming capacitors, vertical interconnects and jumpers. An opening is provided in the PET carrier layer of the booster antenna circuit (BAC, 944) to allow for the protruding boss 932 from the front face metal layer 930;

948: Adhesive layer (25 μm)—thermosetting epoxy—spanning the entire width and length of the card body, being assembled to the bottom side of the booster antenna circuit (BAC) 944 and the metal interlayer 950 with a module opening (MO) 914 stuffed with a plastic slug 915 and a slit (S) 920;

950: Metal interlayer with a module opening MO 914 (stuffed with a plastic slug 915), a metal ledge 916 and a slit (S) 920 having a thickness of approximately 152 μm is attached to the rear synthetic layers by an adhesive layer 958;

958: Adhesive layer (25 μm)—thermosetting epoxy—attaching the metal interlayer 950 to the top side of the synthetic layer 960;

960: Transparent, translucent, white or colored synthetic layer (e.g. PVC, PC, PETG), typically having a thickness of 125 μm;

962 primer;

964 ink (printed information (PI));

The position of 962 and 964 may be interchangeable depending on the printing process.

970: Laser engravable overlay layer (PVC) typically having a thickness of 60 μm;

974: Magnetic stripe mounted to the rear overlay layer 970;

976: Operation of laser marking to the rear overlay layer 970 with personalization data; and Security elements (signature panel and hologram) are not shown.

FIG. 9B is a diagram (exploded perspective view) of the underside 931 of the front face metal layer 930 with a protruding boss 932 and a slightly raised metal ledge 933 running along the outer edge of the metal layer 930, and showing a module opening 912 to accept the implanting of a transponder chip module.

FIG. 9C is a cross sectional diagram of a smartcard (SC) 900 having a front face metal layer (continuous) 930 and a rear metal interlayer (discontinuous) 950, sandwiching a magnetic shielding layer (i.e. ferrite layer) 942 adhesively attached to a boater antenna circuit 944, with the front face metal layer 930 having a protruding boss 932 which passes through cut-outs in the adhesive layer 938, magnetic shielding layer 942, adhesive layer 943 and the booster antenna circuit 944, with the boss 932 attached to the rear metal interlayer 950 by means of an insulating adhesive layer 948.

FIG. 10A is a diagram showing a top layer of a plated copper antenna circuit with a perimeter coil (1044A) connected to top electrodes of a capacitor bank (1044D) on a PET carrier layer 1044B, forming part of a card body 1000A. The perimeter coil is routed very closely to the edges of the card body and inductively couples with the metal edges of the discontinuous metal layer on the rear side of the card body.

FIG. 10B is a diagram showing a bottom layer of a plated copper antenna circuit with a coupler coil (1044C) on the underside of the forementioned PET carrier layer 1044B and connected to bottom electrodes of the capacitor bank (1044E). The coupler coil inductively couples simultaneously with the module antenna of the transponder chip module and the metal ledge surrounding the module opening in the discontinuous metal layer.

FIG. 10C is a exploded stack-up view of the rear layers of a smartcard having a booster antenna circuit (1044) assembled to a discontinuous metal layer (1050), with the booster antenna circuit having a perimeter coil (1044A), a coupler coil (1044C) and frequency trimming capacitor electrodes (1044D and 1044E), and the discontinuous metal layer (1050) having a metal ledge (1016) surrounding a module opening (1014) and a slit (1020A) terminating in the module opening (1014) and in addition having a second slit (1020B) to improve the activation distance in contactless mode. The outer windings of the perimeter coil (1044A) are arranged to be as close as possible to the metal edges of the discontinuous metal layer (1050) preferably under 500 μm, with the windings overlapping the slits (1020A and 1020B). The coupler coil (1044C) overlaps the metal ledge (1016) surrounding the module opening (1014) and the slit (1020A) in the discontinuous metal layer (1050). In addition, the coupler coil inductively couples with the module antenna (1011) of the transponder chip module.

FIG. 11A is a diagram (exploded perspective view) of the stack-up construction of a dual interface metal face smartcard (1100A) with contactless tap to pay function from the rear side of the card body, having a booster antenna circuit (BAC: 1144) mounted on a magnetic shielding layer (1142) via an adhesive layer (1143) with both component elements sandwiched between a front face solid metal layer (1130) and a rear metal interlayer (1150).

The front face solid metal layer (1130) is continuous metal layer with no discontinuity, and having a module opening (MO: 1112). The rear metal interlayer (1150) is a discontinuous metal layer having a module opening (MO: 1114) and a slit (S: 1120A), to function as a coupling frame for contactless communication. The module openings (MO: 1112, 1114) accept the placement of a transponder chip module (TCM: 1110) with its module antenna (MA: 1111) inductively coupling with the coupler coil (CC: 1144C) of the booster antenna circuit (BAC: 1144) and simultaneously overlapping the metal ledge (1116) having a metal edge which surrounds the module opening (MO: 1114) and slit (S: 1120A) in the metal interlayer (1150). The dimensional arrangement of the module antenna (MA: 1111), coupler coil (CC: 1144C) and the metal ledge (1116) around the module opening (MO: 1114) is one of concentricity.

The transponder chip module may have contact pads (CP) on its front (exposed) surface for effecting contact communication with an external reader. The module antenna (MA) provides for contactless communication with an external reader. Generally, the transponder chip module (TCM) described herein, and the resulting smartcard (SC), has at least contactless capability, and may be dual interface (contact, and contactless).

The stack-up construction of the card body (CB: 1100A) (smartcard (SC) or transaction card (TC)) with a front face continuous metal layer without a discontinuity and a rear discontinuous metal layer with a discontinuity may comprise the following layers (all dimensions and parameters are exemplary and approximate):

1110: Dual-interface transponder chip module (TCM) or inductive coupling module (ICM) with an arrangement of pads on its front face (contact side) and having a module antenna (MA: 1111) on its rear face (bond side);

1111: A module antenna (MA) with a given number of windings (12 to 24 turns) depending on the input capacitance of the RFID chip (not shown);

1112: Module opening (MO) with a P1 metal ledge 1113 in the front face metal layer (ML: 1130) without a slit;

1113: Metal ledge to mechanically support the transponder chip module (1110), being attached to the metal ledge using an adhesive tape (not shown);

1114: Module opening (MO) (optionally stuffed with a plastic slug (1115)) with a P2 metal ledge (1116) on the rear metal interlayer (1150) having a slit (S: 1120A) to function as a coupling frame;

1115: A color matching plastic slug with or without an adhesive backing fills the gap or void in the module opening (1114);

1116: Metal ledge P2 with its metal edge surrounding the module opening (MO: 1114) for inductive coupling with the module antenna (1111);

1176: The operation of laser marking the laser reactive protective layer (1124) with personalization data;

1124: Laser reactive protective layer—a coating of matte or gloss finish applied using a roller coater or screen printer which can be laser marked for personalization, and protecting an underlying clear coat of rigid ink (1125);

1125: A transparent coat of rigid ink (hard coat) for scratch protection applied by means of digital printing over the graphic ink layer (1126);

1126: A digitally printed ink (color) layer which may comprise stretchable or rigid ink deposited on the continuous metal layer (1130) using a primer to promote adhesion;

The total thickness of the laser reactive coating (1124), the transparent hard coat (1125) and the graphic print layer of ink and primer (1126) applied to the continuous metal surface (1130) is typically 40 μm.

1130: Front face metal layer without a slit ("continuous"), which may have the print layer 1126 (ink and primer) disposed on it. A typical thickness for this metal layer may be 203 μm;

1138: Adhesive layer (25 μm)—thermosetting epoxy—to attach the magnetic shielding layer (1142) to the rear side of the front face metal layer (1130);

1142: High permeability magnetic sheet shielding layer with a thickness of 50 μm or 100 μm which may compose of the following: calcium carbonate ($CaCO_3$), silicon dioxide ($SiO_2$), magnesium fluoride ($MgF_2$), SiO2, chromium (Cr) and iron (Fe), to offset the effects of electromagnetic shielding caused by the front face metal layer (1130) and having a booster antenna circuit (1144) assembled to its face downside by means of an adhesive layer (1143);

1144: Closed loop booster antenna circuit (chemically etched, plated copper tracks, conductive printed tracks, wire embedding or equivalent) attached to the high permeability magnetic shielding layer, low magnetic loss ferrite layer 1142 (50 μm or 100 μm in thickness) by means of an adhesive layer (1143) (50 μm), with the booster antenna circuit (BAC) comprising of a perimeter coil (1144A), a coupler coil (1144C) and a set of parallel plate trimming capacitors (capacitor bank for tuning not shown), with the booster antenna circuity (BAC) being assembled on a PET carrier layer (23 μm) (1144B) having a top antenna layer (perimeter coil (1144A) with 12 windings (copper track width: 150 μm, spacing between tracks: 100 μm, copper track thickness: 12-35 μm—total width of perimeter coil: 2.9 mm,)) vertical interconnects and the upper capacitor plate electrodes with said top antenna layer facing the magnetic shielding layer (1142), and having a bottom antenna layer (coupler coil (1144C) with 9 windings (copper track width: 250 μm, spacing between tracks: 100 μm, copper track thickness: 12-35 μm—total width of coupler coil: 3.05 mm)) connection jumpers and the lower capacitor plate electrodes with said bottom antenna layer facing the rear metal interlayer (1150) acting as a coupling frame;

The perimeter coil (1144A) with 12 turns spanning a width of 2.9 mm is positioned as close as possible to the edge of the metal interlayer (1150) to achieve optimum RF performance. The distance may be set to 450 μm or lower. The RF performance decays rapidly with increasing distance of the perimeter coil (1144A) from the edge of the discontinuous metal layer (1150).

The coverage of the module antenna (MA: 1111) sitting on the footprint of the coupler coil (CC: 1144C) is ideally 100%, while the coupler coil (CC: 1144C) overlapping the metal ledge (1116) of the module opening (MO: 1114) should ideally be 50%.

Notably, the arrangement of the perimeter coil and the coupler coil on the PET carrier layer being respectively positioned on the top and bottom surfaces thereof may be interchanged or portions of their antenna structures may be located on both sides of the carrier layer;

The booster antenna circuit (BAC) is similar to a booster antenna as disclosed in U.S. Pat. No. 9,033,250, but the circuitry is a closed loop with no open-ended antenna elements and having an integrated parallel plate capacitor bank for frequency trimming. The capacitor plates are in parallel with the coupler coil and perimeter coil.

1148: Adhesive layer (25 μm)—thermosetting epoxy—assembled between the bottom side of the booster antenna circuit (BAC: 1144) and the metal interlayer (1150) with the module opening (MO: 1114), metal ledge (1115) and slit (S: 1120A);

1150: Metal interlayer with a module opening (MO: 1114), a slit (S: 1120A) and a metal ledge (1116) having a metal edge which surrounds the module opening (MO: 1114), having a thickness of approximately 152 μm is attached to the rear synthetic layers by an adhesive layer (1158);

1158: Adhesive layer (25 μm)—thermosetting epoxy—attaching the metal interlayer (1150) to the top side of the synthetic layer (1160);

1160: Transparent, translucent, white or colored synthetic layer (e.g. PVC, PC, PETG), typically having a thickness of 125 μm;

1162 primer;

1164 ink (printed information (PI));

The position of (1162) and (1164) may be interchangeable depending on the printing process. In some instances, the primer may be omitted. The thickness of the print layer (1160) may be significantly reduced when the ink deposition process is digital.

1170: Laser engravable overlay layer (PVC) typically having a thickness of 60 μm;

1174: Magnetic stripe mounted to the rear overlay layer (1170);

1176: The operation of laser marking the rear overlay layer (1170) with personalization data; and Security elements (signature panel and hologram) are not shown.

To increase the activation distance of the smartcard (1100A), an additional slit (S: 1120B) may be formed in the discontinuous metal layer (1150), with the slit crossing the tracks of the perimeter coil 1144A to pick up surface currents.

In their various embodiments, the invention(s) described herein may relate to payment smartcards (metal, plastic or a combination thereof), electronic credentials, identity cards, loyalty cards, access control cards, and the like.

While the invention(s) may have been described with respect to a limited number of embodiments, these should not be construed as limitations on the scope of the invention(s), but rather as examples of some of the embodiments of the invention(s). Those skilled in the art may envision other possible variations, modifications, and implementations that are also within the scope of the invention(s), and claims, based on the disclosure(s) set forth herein.

What is claimed is:

1. Smartcard, capable of at least contactless operation, comprising:
   a front face continuous metal layer (ML, CML) without a slit and having a first module opening (MO);
   a rear discontinuous metal layer (ML, DML) having a metal ledge surrounding a second module opening (MO) and a slit (S);
   a transponder chip module (TCM) with a module antenna (MA); and
   an assembly of at least one of a magnetic shielding layer (MSL) and a booster antenna circuit (BAC) disposed between the front face continuous metal layer and the rear discontinuous metal layer;
   wherein:
   the booster antenna circuit (BAC) comprises a perimeter coil (PC) and a coupler coil (CC); and
   the booster antenna circuit comprises a closed loop circuit with no open-ended antenna elements;
   further comprising:
   an integrated parallel plate capacitor bank comprising upper electrodes (UE) and lower electrodes (LE) attached in parallel to the perimeter coil and coupler coil for frequency trimming.

2. The smartcard of claim 1, wherein:
   the magnetic shielding layer is disposed behind the front face continuous metal layer; and
   the booster antenna circuit is disposed behind the magnetic shielding layer.

3. The smartcard of claim 1, wherein:
   the rear discontinuous metal layer (DML) with a slit (S) which terminates in a module opening (MO), is provided with at least one additional slit arranged on another side of the discontinuous metal layer.

4. Smartcard, capable of at least contactless operation, comprising:
   a front face continuous metal layer (ML, CML) without a slit and having a first module opening (MO);
   a rear discontinuous metal layer (ML, DML) having a metal ledge surrounding a second module opening (MO) and a slit (S);
   a transponder chip module (TCM) with a module antenna (MA); and
   an assembly of at least one of a magnetic shielding layer (MSL) and a booster antenna circuit (BAC) disposed between the front face continuous metal layer and the rear discontinuous metal layer;
   wherein:
   the module antenna (MA) of the transponder chip module (TCM) is arranged concentrically to overlap the coupler coil (CC) of the booster antenna circuit (BAC) and a metal ledge surrounding the module opening (MO) in the rear discontinuous metal layer.

5. The smartcard of claim 4, wherein:
   the magnetic shielding layer is disposed behind the front face continuous metal layer; and
   the booster antenna circuit is disposed behind the magnetic shielding layer.

6. The smartcard of claim 4, wherein:
   the booster antenna circuit (BAC) comprises a perimeter coil (PC) and a coupler coil (CC); and
   the booster antenna circuit comprises a closed loop circuit with no open-ended antenna elements.

7. The smartcard of claim 4, wherein:
   the rear discontinuous metal layer (DML) with a slit (S) which terminates in a module opening (MO), is provided with at least one additional slit arranged on another side of the discontinuous metal layer.

8. Smartcard, capable of at least contactless operation, comprising:
   a front face continuous metal layer (ML, CML) without a slit and having a first module opening (MO);
   a rear discontinuous metal layer (ML, DML) having a metal ledge surrounding a second module opening (MO) and a slit (S);
   a transponder chip module (TCM) with a module antenna (MA); and
   an assembly of at least one of a magnetic shielding layer (MSL) and a booster antenna circuit (BAC) disposed between the front face continuous metal layer and the rear discontinuous metal layer;
   wherein:
   the underside of the front face continuous metal layer has a protruding boss which extends through the card assembly to the rear discontinuous metal layer.

9. The smartcard of claim 8, wherein:
   the protruding boss adds weight to the smartcard, enhances a metal sound and provides for mechanical robustness.

10. The smartcard of claim 8, wherein:
the magnetic shielding layer is disposed behind the front face continuous metal layer; and
the booster antenna circuit is disposed behind the magnetic shielding layer.

11. The smartcard of claim 8, wherein:
the booster antenna circuit (BAC) comprises a perimeter coil (PC) and a coupler coil (CC); and
the booster antenna circuit comprises a closed loop circuit with no open-ended antenna elements.

12. The smartcard of claim 8, wherein:
the rear discontinuous metal layer (DML) with a slit (S) which terminates in a module opening (MO), is provided with at least one additional slit arranged on another side of the discontinuous metal layer.

13. A smartcard, comprising:
a front metal layer (ML, FML) without a slit and having a first module opening (MO);
a rear metal layer (ML, RML) having a second module opening (MO) and a slit (S); and
a booster antenna circuit (BAC) disposed between the front face metal layer and the rear metal layer;
wherein the booster antenna circuit (BAC) comprises a perimeter coil (PC) and a coupler coil (CC); and
wherein outer windings of the perimeter coil are arranged to be as close as possible to an outer peripheral edge of the rear metal layer;
wherein:
the outer windings of the perimeter coil are within 500 μm of the outer edge of the rear metal layer.

14. The smartcard of claim 13, wherein:
at least some windings of the perimeter coil overlap the slit.

15. The smartcard of claim 13, further comprising:
a metal ledge surrounding the second module opening;
wherein the coupler coil overlaps the metal ledge.

16. The smartcard of claim 13, further comprising:
a magnetic shielding layer disposed between the front metal layer and the rear metal layer.

17. The smartcard of claim 13, further comprising:
a transponder chip module (TCM) having a module antenna (MA) disposed in the module openings.

18. The smartcard of claim 13, wherein:
the transponder chip module has the module antenna (MA) and contact pads (CP) for dual interface capability.

19. The smartcard of claim 13, further comprising:
frequency trimming capacitor electrodes.

\* \* \* \* \*